US012610387B2

(12) United States Patent
Xu et al.

(10) Patent No.: US 12,610,387 B2
(45) Date of Patent: Apr. 21, 2026

(54) TECHNIQUES FOR CROSS-LINK INTERFERENCE MEASUREMENT FOR CELL DISCONTINUOUS RECEPTION

(71) Applicant: QUALCOMM Incorporated, San Diego, CA (US)

(72) Inventors: Huilin Xu, Temecula, CA (US); Diana Maamari, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 18/162,799

(22) Filed: Feb. 1, 2023

(65) Prior Publication Data

US 2024/0260073 A1    Aug. 1, 2024

(51) Int. Cl.
*H04W 72/541*        (2023.01)
*H04W 72/12*         (2023.01)
(Continued)

(52) U.S. Cl.
CPC ......... *H04W 72/541* (2023.01); *H04W 72/12* (2013.01); *H04W 72/20* (2023.01); *H04W 76/28* (2018.02)

(58) Field of Classification Search
CPC ... H04W 72/541; H04W 72/12; H04W 72/20; H04W 76/28; H04W 24/10; H04B 17/29; H04B 17/15; H04B 17/318
(Continued)

(56) References Cited

U.S. PATENT DOCUMENTS

2010/0190488 A1*  7/2010  Jung ..................... H04W 24/10
                                                  455/67.11
2014/0269480 A1*  9/2014  Han .................. H04W 52/0216
                                                  370/311
(Continued)

FOREIGN PATENT DOCUMENTS

WO        2021253150 A1    12/2021
WO        2022010632 A1     1/2022
(Continued)

OTHER PUBLICATIONS

International Search Report and Written Opinion—PCT/US2023/085825—ISA/EPO—Apr. 26, 2024.

*Primary Examiner* — Ricardo H Castaneyra
(74) *Attorney, Agent, or Firm* — Paul M. McAdams; Holland & Hart LLP

(57)        ABSTRACT

Methods, systems, and devices for wireless communications are described. A user equipment (UE) may skip a cross-link interference (CLI) measurement in a scheduled CLI measurement occasion that at least partially overlaps with an "inactive" period of a cell discontinuous reception (DRX) cycle. UEs served by a cell generally do not transmit during the "inactive" period of the cell DRX cycle as the cell does not monitor for transmissions during the "inactive" period. Accordingly, measuring CLI during the "inactive" period of a cell DRX cycle may waste power at the victim UE and may underestimate CLI. Therefore, a UE may skip one or more CLI measurements in one or more scheduled CLI monitoring occasions that overlap with the "inactive" period of the cell DRX cycle. The network may indicate whether to skip or perform CLI measurements in CLI measurement occasions scheduled during the "inactive" period of the cell DRX cycle.

22 Claims, 16 Drawing Sheets

(51) Int. Cl.
H04W 72/20 (2023.01)
H04W 76/28 (2018.01)

(58) Field of Classification Search
USPC ..... 370/329, 311, 332, 241; 455/67.11, 574,
455/343.2
See application file for complete search history.

(56) References Cited

U.S. PATENT DOCUMENTS

| | | | | |
|---|---|---|---|---|
| 2019/0349120 | A1* | 11/2019 | Cheng ................... | H04L 5/0053 |
| 2021/0203468 | A1* | 7/2021 | Yi ...................... | H04W 72/0453 |
| 2022/0015114 | A1* | 1/2022 | Xu ........................ | H04L 5/0073 |

FOREIGN PATENT DOCUMENTS

| | | | |
|---|---|---|---|
| WO | 2022032619 | A1 | 2/2022 |
| WO | 2022085975 | A1 | 4/2022 |
| WO | 2024044431 | A1 | 2/2024 |

* cited by examiner

Measured CLI Measurement
Occasion 365-a

Skipped CLI Measurement
Occasion 365-b time

DRX on
355-a

DRX off
360-a

DRX on
355-b

DRX off
360-b

DRX cycle
350-a

DRX cycle
350-b 315     320     325     310-a 105-a

Network Entity 305-a        330        335

115-a 125-a

345

305-b 310-b

370

125-b 115-b

300

510

520

515

505

500

910

920

915

905

900

130

105

115

Network Entity

Transceiver

1210

Antenna

1215

Communications Manager

1220

Memory

Code

1230

1225

1240

Processor

1235

1205

1200

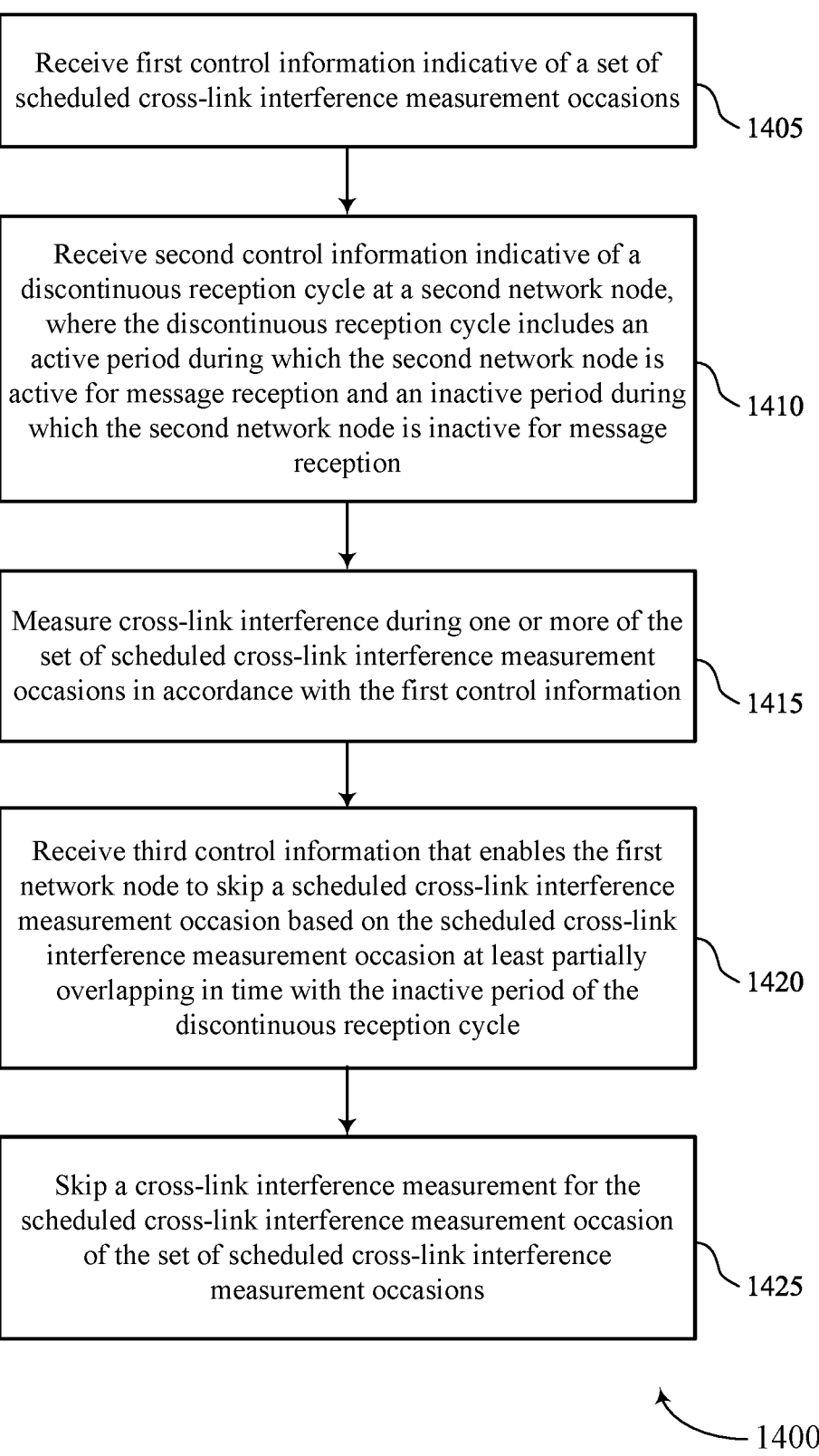

Receive first control information indicative of a set of scheduled cross-link interference measurement occasions

⟍1405

Receive second control information indicative of a discontinuous reception cycle at a second network node, where the discontinuous reception cycle includes an active period during which the second network node is active for message reception and an inactive period during which the second network node is inactive for message reception

⟍1410

Measure cross-link interference during one or more of the set of scheduled cross-link interference measurement occasions in accordance with the first control information

⟍1415

Receive third control information that enables the first network node to skip a scheduled cross-link interference measurement occasion based on the scheduled cross-link interference measurement occasion at least partially overlapping in time with the inactive period of the discontinuous reception cycle

⟍1420

Skip a cross-link interference measurement for the scheduled cross-link interference measurement occasion of the set of scheduled cross-link interference measurement occasions

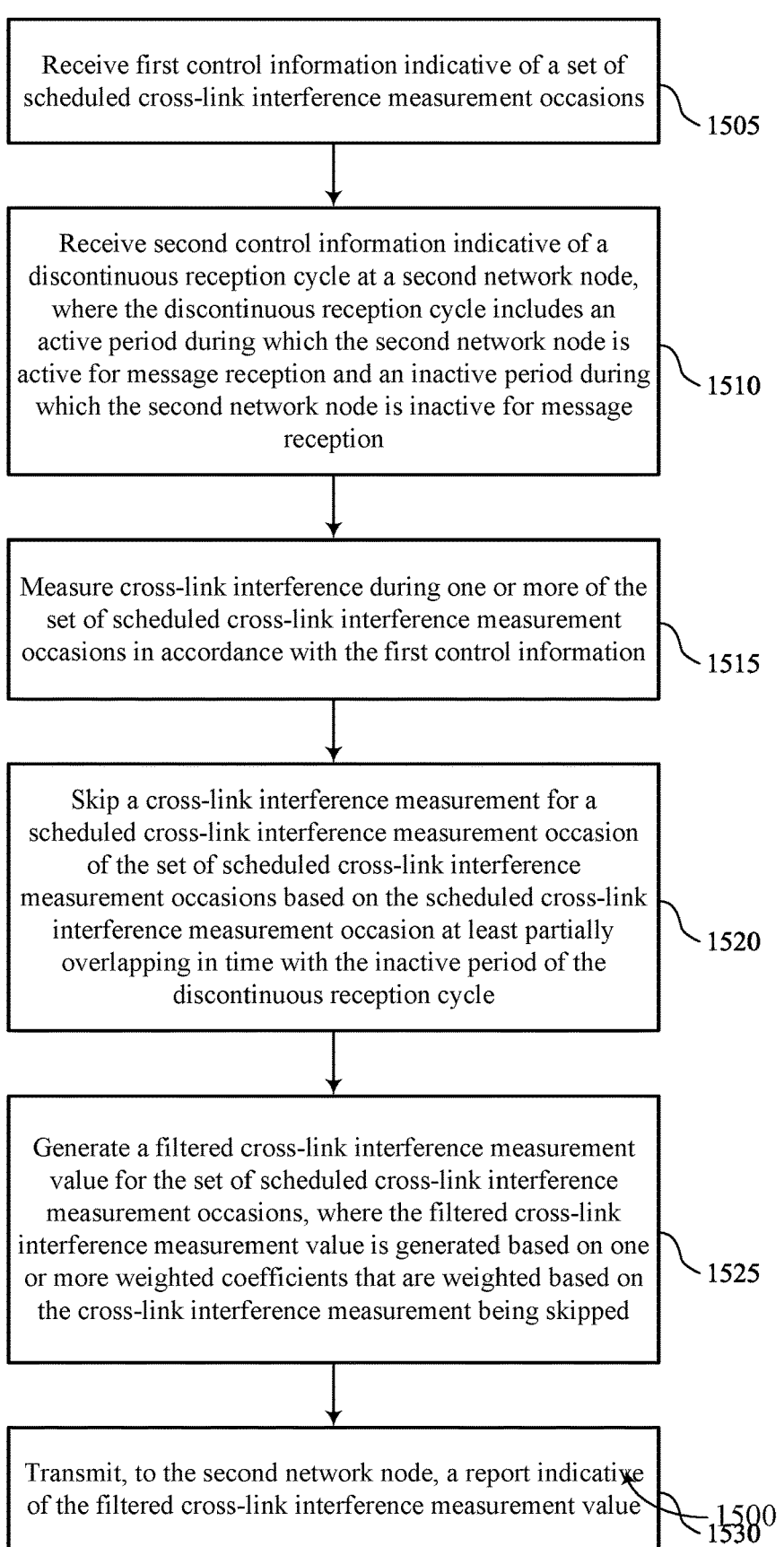

Receive first control information indicative of a set of scheduled cross-link interference measurement occasions ⟩ 1505

Receive second control information indicative of a discontinuous reception cycle at a second network node, where the discontinuous reception cycle includes an active period during which the second network node is active for message reception and an inactive period during which the second network node is inactive for message reception ⟩ 1510

Measure cross-link interference during one or more of the set of scheduled cross-link interference measurement occasions in accordance with the first control information ⟩ 1515

Skip a cross-link interference measurement for a scheduled cross-link interference measurement occasion of the set of scheduled cross-link interference measurement occasions based on the scheduled cross-link interference measurement occasion at least partially overlapping in time with the inactive period of the discontinuous reception cycle ⟩ 1520

Generate a filtered cross-link interference measurement value for the set of scheduled cross-link interference measurement occasions, where the filtered cross-link interference measurement value is generated based on one or more weighted coefficients that are weighted based on the cross-link interference measurement being skipped ⟩ 1525

Transmit, to the second network node, a report indicative of the filtered cross-link interference measurement value ⟩ 1530

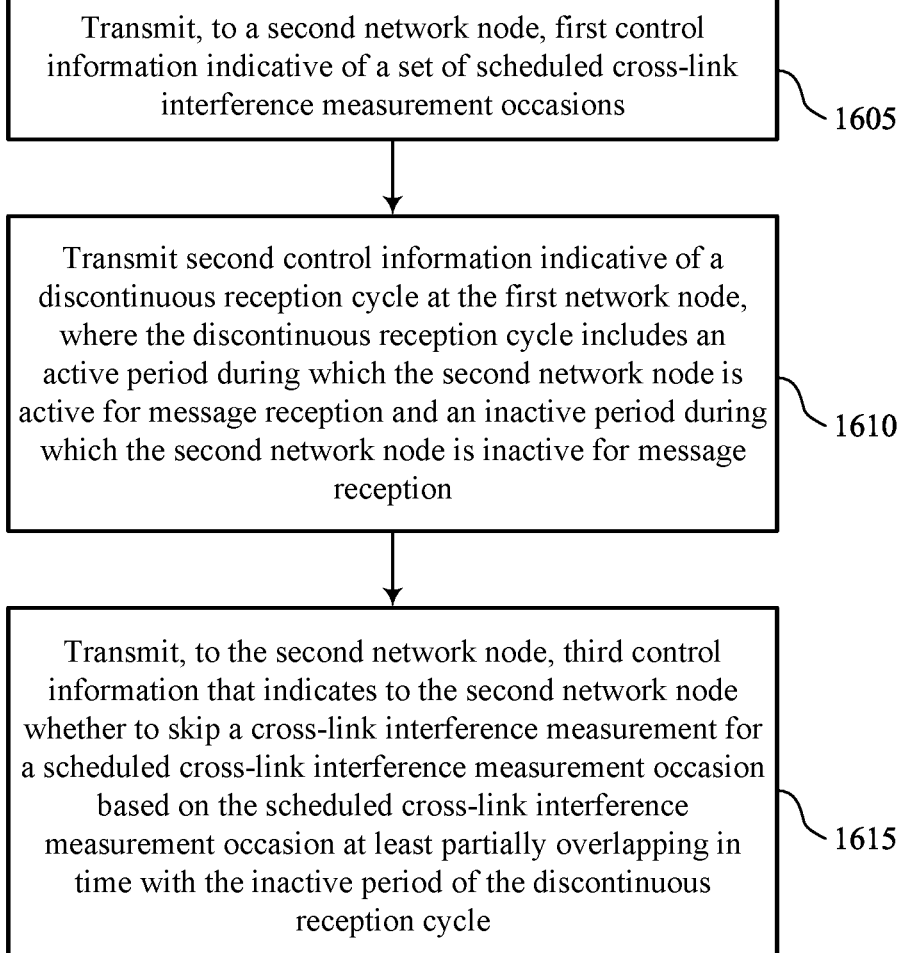

Transmit, to a second network node, first control information indicative of a set of scheduled cross-link interference measurement occasions

1605

Transmit second control information indicative of a discontinuous reception cycle at the first network node, where the discontinuous reception cycle includes an active period during which the second network node is active for message reception and an inactive period during which the second network node is inactive for message reception

1610

Transmit, to the second network node, third control information that indicates to the second network node whether to skip a cross-link interference measurement for a scheduled cross-link interference measurement occasion based on the scheduled cross-link interference measurement occasion at least partially overlapping in time with the inactive period of the discontinuous reception cycle

TECHNIQUES FOR CROSS-LINK INTERFERENCE MEASUREMENT FOR CELL DISCONTINUOUS RECEPTION

INTRODUCTION

The following relates to wireless communications pertaining to cross-link interference measurement for cell discontinuous reception.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for cross-link interference (CLI) measurement for cell discontinuous reception (DRX). For example, the described techniques provide for a user equipment (UE) to skip a CLI measurement in a scheduled CLI measurement occasion that at least partially overlaps with an "inactive" period of a cell DRX cycle. For a cell DRX mode, UEs served by the cell generally do not transmit during the "inactive" period of the DRX cycle as the cell does not monitor for transmissions from the UEs during the "inactive" period. Accordingly, measuring CLI during the "inactive" period of a cell DRX cycle may waste power at the victim UE and may result in underestimation of CLI. Therefore, a UE may skip one or more CLI measurements in one or more scheduled CLI monitoring occasions that overlap with the "inactive" period of the cell DRX cycle. In some aspects, the network may indicate (e.g., dynamically or semi-statically) whether to skip or perform CLI measurements in CLI measurement occasions scheduled during the "inactive" period of the cell DRX cycle. In some aspects, the UE may adjust the value of a determined or reported CLI to take into account that one or more CLI measurement opportunities were skipped during the "inactive" period of the cell DRX cycle.

A method for wireless communications at a first network node is described. The method may include receiving first control information indicative of a set of scheduled CLI measurement occasions, receiving second control information indicative of a DRX cycle at a second network node, where the DRX cycle includes an active period during which the second network node is active for message reception and an inactive period during which the second network node is inactive for message reception, measuring CLI during one or more of the set of scheduled CLI measurement occasions in accordance with the first control information, and skipping a CLI measurement for a scheduled CLI measurement occasion of the set of scheduled CLI measurement occasions based on the scheduled CLI measurement occasion at least partially overlapping in time with the inactive period of the DRX cycle.

A first network node for wireless communications is described. The network node may include: a memory; and at least one processor coupled to the memory, where the at least one processor is configured to receive first control information indicative of a set of scheduled CLI measurement occasions, receive second control information indicative of a DRX cycle at a second network node, where the DRX cycle includes an active period during which the second network node is active for message reception and an inactive period during which the second network node is inactive for message reception, measure CLI during one or more of the set of scheduled CLI measurement occasions in accordance with the first control information, and skip a CLI measurement for a scheduled CLI measurement occasion of the set of scheduled CLI measurement occasions based on the scheduled CLI measurement occasion at least partially overlapping in time with the inactive period of the DRX cycle.

An apparatus for wireless communications at a first network node is described. The apparatus may include means for receiving first control information indicative of a set of scheduled CLI measurement occasions, means for receiving second control information indicative of a DRX cycle at a second network node, where the DRX cycle includes an active period during which the second network node is active for message reception and an inactive period during which the second network node is inactive for message reception, means for measuring CLI during one or more of the set of scheduled CLI measurement occasions in accordance with the first control information, and means for skipping a CLI measurement for a scheduled CLI measurement occasion of the set of scheduled CLI measurement occasions based on the scheduled CLI measurement occasion at least partially overlapping in time with the inactive period of the DRX cycle.

A non-transitory computer-readable medium storing code for wireless communications at a first network node is described. The code may include instructions executable by a processor to receive first control information indicative of a set of scheduled CLI measurement occasions, receive second control information indicative of a DRX cycle at a second network node, where the DRX cycle includes an active period during which the second network node is active for message reception and an inactive period during which the second network node is inactive for message reception, measure CLI during one or more of the set of scheduled CLI measurement occasions in accordance with the first control information, and skip a CLI measurement for a scheduled CLI measurement occasion of the set of scheduled CLI measurement occasions based on the scheduled CLI measurement occasion at least partially overlapping in time with the inactive period of the DRX cycle.

Some examples of the method, first network node, apparatuses, and non-transitory computer-readable medium described herein may further include operations, features, means, or instructions for receiving third control information that enables the first network node to skip the scheduled CLI measurement occasion.

Some examples of the method, first network node, apparatuses, and non-transitory computer-readable medium described herein may further include operations, features, means, or instructions for receiving fourth control information that includes an indication that at least one of the one or more of the set of scheduled CLI measurement occasions at least partially overlaps in time with the inactive period of the DRX cycle.

In some examples of the method, first network node, apparatuses, and non-transitory computer-readable medium described herein, receiving the fourth control information may include operations, features, means, or instructions for receiving the fourth control information from the second network node, where the fourth control information includes an indication enabling measurement of cross link interference in the at least one of the one or more of the set of scheduled CLI measurement occasions that at least partially overlaps in time with the inactive period of the DRX cycle.

Some examples of the method, first network node, apparatuses, and non-transitory computer-readable medium described herein may further include operations, features, means, or instructions for receiving a first control message including the first control information and receiving a second control message including the third control information.

Some examples of the method, first network node, apparatuses, and non-transitory computer-readable medium described herein may further include operations, features, means, or instructions for receiving a same control message including the first control information and the third control information.

Some examples of the method, first network node, apparatuses, and non-transitory computer-readable medium described herein may further include operations, features, means, or instructions for generating a filtered CLI measurement value for the set of scheduled CLI measurement occasions, where the filtered CLI measurement value may be generated based on one or more weighted coefficients that may be weighted based on the CLI measurement being skipped and transmitting, to the second network node, a report indicative of the filtered CLI measurement value.

Some examples of the method, first network node, apparatuses, and non-transitory computer-readable medium described herein may further include operations, features, means, or instructions for adjusting the one or more weighted coefficients based on a duration of time between a first measured CLI measurement occasion before the scheduled CLI measurement occasion that may be skipped and a second measured CLI measurement occasion after the scheduled CLI measurement occasion that may be skipped.

Some examples of the method, first network node, apparatuses, and non-transitory computer-readable medium described herein may further include operations, features, means, or instructions for transmitting, to the second network node, third control information indicative of a capability of the first network node to adjust the one or more weighted coefficients based on the duration of time.

In some examples of the method, first network node, apparatuses, and non-transitory computer-readable medium described herein, the adjustment may be based on a comparison between the duration of time and a threshold.

Some examples of the method, first network node, apparatuses, and non-transitory computer-readable medium described herein may further include operations, features, means, or instructions for transmit, to the second network node, third control information indicative of a capability of the first network node to skip one or more scheduled CLI measurement occasions that at least partially overlap in time with the inactive period of the DRX cycle.

In some examples of the method, first network node, apparatuses, and non-transitory computer-readable medium described herein, the set of scheduled CLI measurement occasions may be associated with a same CLI measurement resource configuration.

A method for wireless communications at a first network node is described. The method may include transmitting, to a second network node, first control information indicative of a set of scheduled CLI measurement occasions, transmitting second control information indicative of a DRX cycle at the first network node, where the DRX cycle includes an active period during which the second network node is active for message reception and an inactive period during which the second network node is inactive for message reception, and transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

A first network node for wireless communications is described. The network node may include: a memory; and at least one processor coupled to the memory, where the at least one processor is configured to transmit, to a second network node, first control information indicative of a set of scheduled CLI measurement occasions, transmit second control information indicative of a DRX cycle at the first network node, where the DRX cycle includes an active period during which the second network node is active for message reception and an inactive period during which the second network node is inactive for message reception, and transmit, to the second network node, third control information that indicates to the second network node whether to skip a CLI measurement for a scheduled CLI measurement occasion based on the scheduled CLI measurement occasion at least partially overlapping in time with the inactive period of the DRX cycle.

Another apparatus for wireless communications at a first network node is described. The apparatus may include means for transmitting, to a second network node, first control information indicative of a set of scheduled CLI measurement occasions, means for transmitting second control information indicative of a DRX cycle at the first network node, where the DRX cycle includes an active period during which the second network node is active for message reception and an inactive period during which the second network node is inactive for message reception, and means for transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

A non-transitory computer-readable medium storing code for wireless communications at a first network node is described. The code may include instructions executable by a processor to transmit, to a second network node, first control information indicative of a set of scheduled CLI measurement occasions, transmit second control information indicative of a DRX cycle at the first network node, where the DRX cycle includes an active period during which the second network node is active for message reception and an inactive period during which the second network node is inactive for message reception, and transmit, to the second network node, third control information that indicates to the second network node whether to skip a CLI measurement for a scheduled CLI measurement occasion based on the scheduled CLI measurement occasion at least partially overlapping in time with the inactive period of the DRX cycle.

In some examples of the method, first network node, apparatuses, and non-transitory computer-readable medium described herein, the third control information enables the second network node to skip the CLI measurement for the scheduled CLI measurement occasion.

Some examples of the method, first network node, apparatuses, and non-transitory computer-readable medium described herein may further include operations, features, means, or instructions for receiving, from the second network node, a report indicative of a filtered CLI measurement value generated at the second network node for the set of scheduled CLI measurement occasions based on one or more weighted coefficients that may be weighted based on the CLI measurement being skipped.

Some examples of the method, first network node, apparatuses, and non-transitory computer-readable medium described herein may further include operations, features, means, or instructions for receiving, from the second network node, fourth control information indicative of a capability of the second network node to adjust one or more weighted coefficients based on a duration of time between a first measured CLI measurement occasion before the scheduled CLI measurement occasion that may be skipped and a second measured CLI measurement occasion after the scheduled CLI measurement occasion that may be skipped.

Some examples of the method, first network node, apparatuses, and non-transitory computer-readable medium described herein may further include operations, features, means, or instructions for receiving, from the second network node, fourth control information indicative of a capability of the second network node to skip one or more scheduled CLI measurement occasions that at least partially overlap in time with the inactive period of the DRX cycle.

In some examples of the method, first network node, apparatuses, and non-transitory computer-readable medium described herein, the third control information enables the second network node to perform CLI measurements for the scheduled CLI measurement occasion.

Some examples of the method, first network node, apparatuses, and non-transitory computer-readable medium described herein may further include operations, features, means, or instructions for transmitting a first control message including the first control information and transmitting a second control message including the third control information.

Some examples of the method, first network node, apparatuses, and non-transitory computer-readable medium described herein may further include operations, features, means, or instructions for transmitting a same control message including the first control information and the third control information.

In some examples of the method, first network node, apparatuses, and non-transitory computer-readable medium described herein, the set of scheduled CLI measurement occasions may be associated with a same CLI measurement resource configuration.

BRIEF DESCRIPTION OF THE DRAWINGS

FIGS. 13 through 16 illustrate flowcharts showing methods that support techniques for CLI measurement for cell DRX in accordance with one or more aspects of the present disclosure.

DETAILED DESCRIPTION

Figure 1:
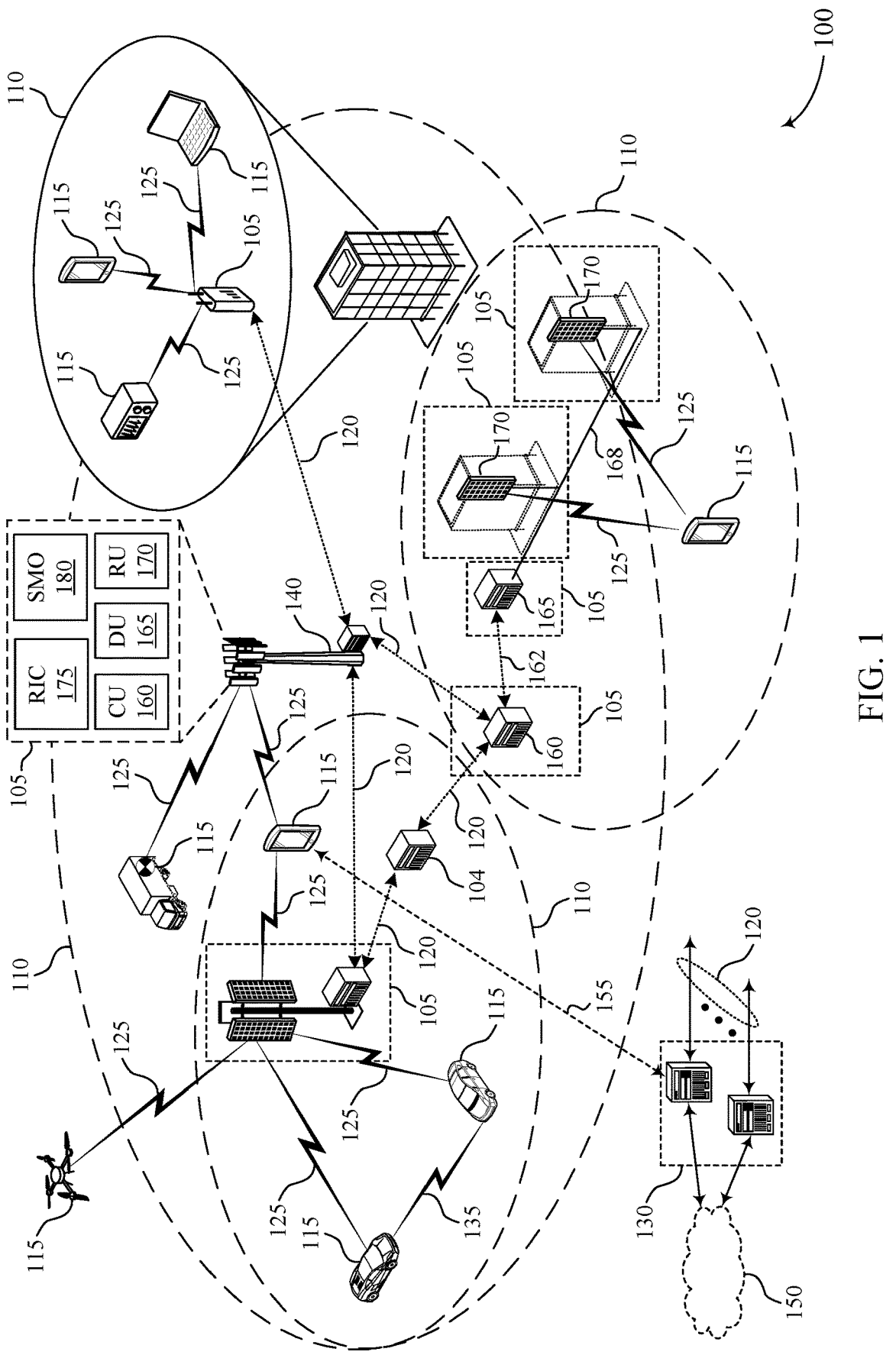
FIG. 1 illustrates an example of a wireless communications system that supports techniques for cross-link interference (CLI) measurement for cell discontinuous reception (DRX) in accordance with one or more aspects of the present disclosure.

In some wireless communications systems, neighboring wireless communications devices (e.g., user equipments (UEs) or network entities) may transmit or receive wireless communications concurrently, which may result in cross-link interference (CLI). To reduce CLI and improve decoding of downlink communications, the network may configure a UE to measure and report CLI. The network may utilize CLI reports from UEs to mitigate CLI throughout the network, such as by adjusting scheduling across UEs or reducing transmit powers for aggressor UEs. In some cases, in order to save power at the network, a serving cell (e.g., a serving network entity) may operate in a discontinuous reception (DRX) mode, during which the cell cycles between active and inactive periods. For a cell DRX mode, UEs served by the cell generally do not transmit during the "inactive" period of the DRX cycle as the cell does not monitor for transmissions from the UEs during the "inactive" period. Accordingly, even if a UE is configured to measure CLI during the "inactive" period of a cell DRX cycle, the measurement may be less meaningful for calculating actual CLI, as other UEs (e.g., aggressor UEs) may elect to not transmit during that time. Thus, measuring CLI during the "off" period of a cell DRX cycle may waste power at the victim UE and may result in underestimation of CLI.

A UE may skip a CLI monitoring occasion scheduled during the "inactive" period of a cell DRX cycle in order to save power and prevent underestimation of CLI. The UE may receive control signaling from the network that indicates a DRX cycle for a cell. The UE may also be configured with a set of CLI monitoring occasions or resources. If a CLI monitoring occasion overlaps with the "inactive" period of the cell DRX cycle, the UE may skip the CLI monitoring occasion (e.g., may skip a measurement for a scheduled CLI monitoring occasion). In one example, the network may indicate whether to skip or perform CLI measurements in CLI measurement occasions scheduled during the "inactive" period of the cell DRX cycle. Such indications may be received by the UE in dynamic signaling or as a semi-static configuration. For example, this indication may be included in a field in the CLI measurement resource configuration that schedules the CLI measurement occasions.

Additionally, or alternatively, the UE may adjust the value of a determined or reported CLI to take into account that one or more CLI measurement opportunities were skipped during the "inactive" period of the cell DRX cycle. For example, the UE may adjust a filter coefficient used to weight CLI measurements so that an older measurement (due to a more recent CLI measurement opportunity being skipped) is given less weight.

Aspects of the disclosure are initially described in the context of wireless communications systems. Aspects of the disclosure are further illustrated by and described with reference to DRX configurations, process flows, apparatus diagrams, system diagrams, and flowcharts that relate to techniques for CLI measurement for cell DRX.

FIG. 1 illustrates an example of a wireless communications system 100 that supports techniques for CLI measurement for cell DRX in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for CLI measurement for cell DRX as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector)

over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Neighboring wireless communications devices in the wireless communications system 100 (e.g., UEs 115 or network entities 105) may transmit or receive wireless communications concurrently, which may result in CLI. To reduce CLI and improve decoding of downlink communications, the network may configure a UE 115 to measure and report CLI. The network may utilize CLI reports from UEs 115 to mitigate CLI throughout the network, such as by adjusting scheduling across UEs 115 or reducing transmit powers of aggressor UEs 115. In some cases, in order to save power at the network, a serving cell (e.g., a serving network entity) may operate in a DRX mode, during which the cell cycles between active and inactive periods. For a cell DRX mode, UEs 115 served by the cell generally do not transmit during the "inactive" period of the DRX cycle as the cell does not monitor for transmissions from the UEs 115 during the "inactive" period. Accordingly, even if a UE 115 is configured to measure CLI during the "inactive" period of a cell DRX cycle, the measurement may be less meaningful for calculating actual CLI, as other UEs 115 (e.g., aggressor UEs 115) may elect to not transmit during that time. Thus, measuring CLI during the "off" period of a cell DRX cycle may waste power at the victim UE 115 and may result in underestimation of CLI.

A UE 115 may skip a CLI monitoring occasion scheduled during the "inactive" period of a cell DRX cycle in order to save power and prevent underestimation of CLI. The UE 115 may receive control signaling from the network that indicates a DRX cycle for a cell. The UE 115 may also be configured with a set of CLI monitoring occasions or resources. If a CLI monitoring occasion overlaps with the inactive or "inactive" period of the cell DRX cycle, the UE may skip the CLI monitoring occasion (e.g., may skip a measurement for a scheduled CLI monitoring occasion). In one example, the network may indicate whether to skip or perform CLI measurements in CLI measurement occasions scheduled during the "inactive" period of the cell DRX cycle. Such indications may be received by the UE 115 in dynamic signaling or as a semi-static configuration. For example, this indication may be included in a field in the CLI measurement resource configuration that schedules the CLI measurement occasions.

Additionally, or alternatively, the UE 115 may adjust the value of a determined or reported CLI to take into account that one or more CLI measurement opportunities were skipped during the "inactive" period of the cell DRX cycle. For example, the UE 115 may adjust a filter coefficient used to weight CLI measurements so that an older measurement (due to a more recent CLI measurement opportunity being skipped) is given less weight.

Figure 2:
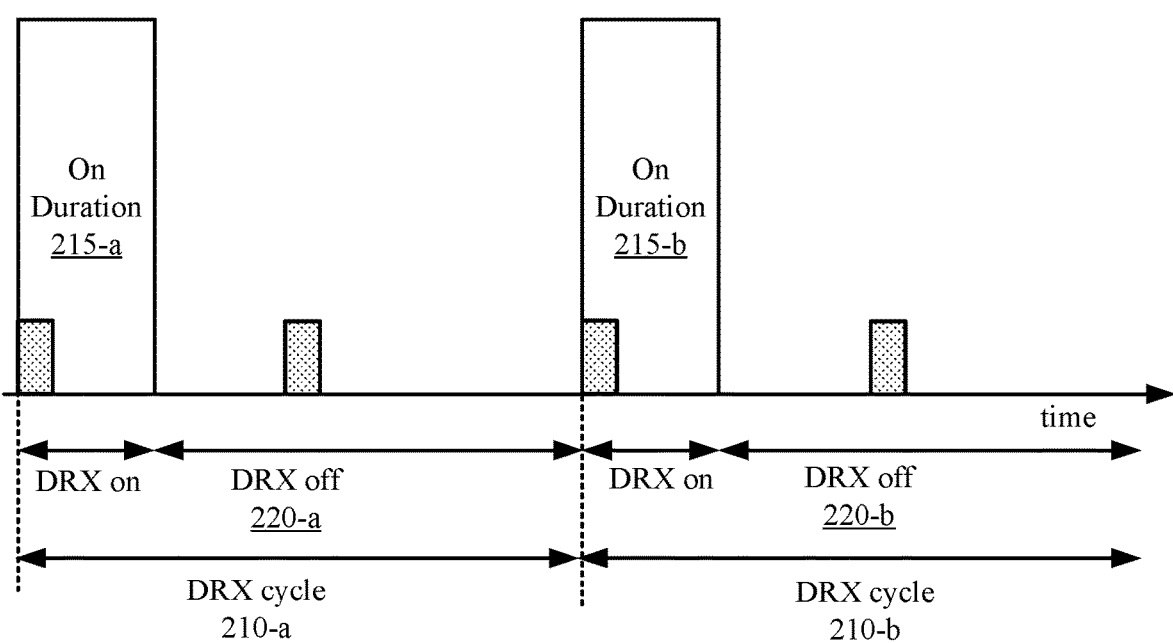
FIG. 2 illustrates an example of a user equipment (UE) DRX configuration that supports techniques for CLI measurement for cell DRX in accordance with one or more aspects of the present disclosure.

FIG. 2 illustrates an example of a UE DRX configuration 200. The UE DRX configuration 200 may implement or may be implemented by aspects of the wireless communications system 100.

To save power at a UE 115, a UE 115 may operate in a UE DRX mode, during which the UE 115 cycles between active and inactive periods. UE DRX reduces receiving operations at the UE 115 by limiting monitoring for reception of signals (e.g., physical downlink control channel (PDCCH)) to the active periods. As shown in the UE DRX configuration 200, a UE DRX cycle 210 may include an on duration 215 (e.g., an active period) during which the UE 115 monitors for reception of signals from a network entity 105 and an off duration 220 (e.g., an inactive period) during which the UE 115 does not monitor for reception of signals from the network entity 105. For example, as shown in the UE DRX configuration 200, a first DRX cycle 210-*a* includes a first on duration 215-*a* and a first off duration 220-*a* and a second DRX cycle 210-*b* includes a second on duration 215-*b* and a second off duration 220-*b*.

UE DRX may be specific to given configured UEs 115 (e.g., to stagger different UEs 115 in time for the ease of multi-user scheduling). During the off duration 220, a UE 115 may still transmit periodic signals in a configured grant (CG) physical uplink control channel (PUSCH) or receive a periodic or semi-persistent scheduled (SPS) grant physical downlink control channel (PDSCH), which the network entity 105 or the UE 115 may blindly decode. For example, the UE 115 may transmit SRSs 225 during the on duration 215 and during the off duration 220, as shown in FIG. 2.

Figure 3:
FIG. 3 illustrates an example of a wireless communications system that supports techniques for CLI measurement for cell DRX in accordance with one or more aspects of the present disclosure.
Figure 3:

As described herein, for example, with reference to FIG. 3, UEs 115 may transmit or receive wireless communications concurrently, which may result in CLI. To reduce CLI and improve decoding of downlink communications, the network may configure a UE to measure and report CLI. When UE DRX is configured, CLI measurements may be performed in both DRX active and DRX inactive states, because different UEs 115 may be configured with different UE DRX configurations (e.g., DRX active-duration start offsets). The DRX inactive state of the victim UE 115 may overlap with the DRX active state of the aggressor UE 115, and accordingly the victim UE 115 may measure CLI during the inactive state of the victim UE 115. Further, the aggressor UE 115 may transmit some signals (e.g., CG PUSCH or periodic or SPS grants) during the inactive state of the aggressor UE 115. For example, UEs 115 may measure CLI during CLI measurement occasions by measuring SRSs, which may be transmitted during the on duration 215 or the off duration of a DRX cycle 220 for an aggressor UE 115.

FIG. 3 illustrates an example of a wireless communications system 300 that supports techniques for CLI measurement for cell DRX in accordance with one or more aspects of the present disclosure. The wireless communications system 300 may implement or may be implemented by aspects of the wireless communications system 100. For example, the wireless communications system 300 may include a UE 115-*a* and a UE 115-*b*, which may be examples of a UE 115 as described herein. The wireless communications system 300 may include a network entity 105-*a*, which may be an example of a network entity 105 as described herein.

The UE 115-*a* may communicate with the network entity 105-*a* using a communication link 125-*a*, and the UE 115-*b* may communicate with the network entity 105-*a* using a communication link 125-*b*. The communication link 125-*a* may be an example of an NR or LTE link between the UE 115-*a* and the network entity 105-*a*. The communication link 125-*b* may be an example of an NR or LTE link between the UE 115-*b* and the network entity 105-*a*. The communication link 125-*a* and the communication link 125-*b* may include bi-directional links that enable both uplink and downlink communications. For example, the UE 115-*a* may transmit uplink signals 305-*a* (e.g., uplink transmissions), such as uplink control signals or uplink data signals, to the network entity 105-*a* using the communication link 125-*a* and the network entity 105-*a* may transmit downlink signals 310-*a* (e.g., downlink transmissions), such as downlink control signals or downlink data signals, to the UE 115-*a* using the communication link 125-*a*. The UE 115-*b* may transmit uplink signals 305-*b* (e.g., uplink transmissions), such as uplink control signals or uplink data signals, to the network entity 105-*a* using the communication link 125-*b* and the network entity 105-*a* may transmit downlink signals 310-*b* (e.g., downlink transmissions), such as downlink control signals or downlink data signals, to the UE 115-*b* using the communication link 125-*b*.

As described herein the UE 115-*a* and the UE 115-*b* may transmit or receive wireless communications concurrently, which may result in CLI. For example, uplink signals 305-*b* transmitted by the UE 115-*b* may cause CLI 345 at the UE 115-*b* with respect to downlink signals 310-*a* that are concurrently scheduled with the uplink signals 305-*b*. To reduce CLI and improve decoding of downlink communications, the network entity 105-*a* may configure the UE 115-*a* to measure and report CLI 345. For example, the network entity 105-*a* may transmit control information 315 scheduling a set of CLI measurement occasions 365 for the UE 115-*a*. The UE 115-*a* may measure CLI in the CLI measurement occasions 365 and transmit one or more CLI reports 330 indicating the measured CLI to the network entity 105-*a*.

CLI measurement and reporting enables dynamic TDD in wireless communications by allowing the network to adjust scheduling across UEs 115 or reducing transmit powers of aggressor UEs (e.g., the UE 115-*b*). For example, slot formats (e.g., which slots or symbols in a slot are assigned for uplink or downlink in a sequence of slots) may be dynamically adjusted based on CLI measurement reports. Dynamic TDD may maximize the flexibility of network scheduling. For example, uplink signals 305 and downlink signals 310 of UEs 115 may be compactly mixed so that spectral efficiency may be dynamically maximized. Dynamic TDD may also improve network energy saving by reducing overall awake time for the network entity 105-*a*.

Different slot formats with conflicting uplink and downlink durations may cause CLI 345 between the UEs 115. The network entity 105-*a* may configure CLI measurements and reports so that the network entity 105-*a* may configure the uplink and downlink slot formats to balance CLI and overall throughput in the cell. In some aspects, CLI measurement resources may be configured in two CLI metrics: SRS reference signal received power (RSRP) or CLI received signal strength indicator (RSSI). For SRS RSRP, CLI 345 is caused by an SRS 370 transmitted by the aggressor UE 115-*b* to the network entity 105-*a* for channel sounding for the aggressor UE 115-*b*. For CLI RSSI, CLI 345 is caused by any uplink signal 305-*b* transmitted by the aggressor UE 115-*b* (e.g., including an SRS 370). CLI measurement may be periodic (e.g., the network entity 105-*a* may schedule the victim UE 115-*a* with a set of CLI measurement occasions 365, which may be periodic), in order to measure CLI caused by periodic transmissions (e.g., SRS, periodic PUSCH, periodic PUCCH) from the aggressor UE 115-*b*.

As described herein, to save power, the network entity 105-*a* may operate in a cell DRX mode, during which the cell cycles between active and inactive periods. A cell DRX mode reduces receiving operations at the network entity 105-*a* by limiting UE transmissions to the active period of the DRX mode. Unlike UE DRX (e.g., as shown in FIG. 2), which is specific to given configured UEs 115 (e.g., to stagger different UEs 115 in time for the ease of multi-user scheduling), cell DRX may be cell specific (e.g., all UEs 115 served by the cell, sector, or beam may share the common DRX configuration so that the network entity 105-*a* may go to sleep (e.g., the inactive mode) without monitoring for signals from any UE). Accordingly, the network entity 105-*a* saves energy in the inactive mode by not monitoring for signals from UEs 115, whereas in an inactive period for UE DRX (e.g., the off duration 220 as shown in FIG. 2), a UE 115 may still transmit periodic signals in a CG PUSCH, which the network entity 105 may blindly decode. When cell DRX is configured, however, a common configuration may be assumed for all UEs 115 served by the cell (e.g., to save energy at the network, the network entity 105-*a* stops monitoring for signals from any UE 115 served by the cell during the DRX inactive mode).

As shown in FIG. 3, a cell DRX cycle 350 may include an on duration 355 (e.g., an active period) during which the network entity 105-*a* monitors for reception of signals from UEs 115 and an off duration 360 (e.g., an inactive period) during which the network entity 105-*a* does not monitor for reception of signals from UEs 115. For example, as shown in FIG. 3, a first DRX cycle 350-*a* includes a first on duration 355-*a* and a first off duration 360-*a* and a second DRX cycle 350-*b* includes a second on duration 355-*b* and a second off duration 360-*b*. The network entity 105-*a* may transmit control information 320 indicating the DRX cycle 350 to the UEs 115. Accordingly, the UEs 115 may not transmit uplink signals 305 during the off duration 360 of the DRX cycle 350, as the network entity 105-*a* does not monitor for uplink signals 305 during the off duration 360 of the DRX cycle 350. For example, the aggressor UE 115-*b* may not transmit SRSs or other signals during the off duration 360. Thus, measuring CLI 345 at the UE 115-*a* during the off duration 360 of a cell DRX cycle 350 may waste power at the victim UE 115-*a* and may result in underestimation of CLI 345.

To avoid wasting power at the victim UE 115-*a* and/or to avoid underestimating CLI 345, the victim UE 115-*a* may skip one or more CLI measurements in CLI measurement occasions 365-*b* that are scheduled during the off duration 360 of the DRX cycle 350. The UE 115-*a* may perform CLI measurements in CLI measurement occasions 365-*a* that are scheduled during the on duration 355 of the DRX cycle 350. Additionally, the UE 115-*a* may adjust layer 3 filtering of instantaneous CLI measurements to accommodate skipped CLI measurement occasions.

In some aspects, the network entity 105-*a* may transmit control information 325 indicating whether to skip or perform a CLI measurement in a given CLI measurement occasion 365 that is scheduled during the off duration 360 of the DRX cycle 350. For example, the indication of whether to skip or perform a CLI measurement in a given CLI measurement occasion 365 that is scheduled during the off duration 360 of the DRX cycle 350 may be semi-static (e.g., in a field in the CLI measurement resource configuration for the set of CLI measurement occasions 365). As another example, the network entity 105-*a* may dynamically indicate whether to skip or perform a CLI measurement in a given CLI measurement occasion 365 (e.g., via a downlink control information).

In some aspects, after an off duration 360 of the DRX cycle 350 (e.g., at the beginning of an on duration 355 of a next DRX cycle 350), the UE 115-*a* may adapt a filtering coefficient to account for skipping a CLI measurement occasion 365 within the off duration 360 of the DRX cycle 350 so that time characteristics of the filter (e.g., the time constant of an infinite impulse response (IIR) filter) may be preserved. An example CLI measurement filtering $F_n$, where $F_n$ is the nth filtered CLI measurement is given by $F_n=(1-\alpha)\times F_{n-1}+\alpha\times M_n$, (where $M_n$ is the nth instantaneous CLI measurement and $\alpha$ is the configured filter coefficient). For example, the more CLI measurement occasions 365 are skipped or the longer the off duration 360 of the DRX cycle 350, the larger the filter coefficient is increased. The UE 115-*a* may report the filtered CLI measurement in a CLI report 330. In some aspects, if the off duration 360 of the DRX cycle 350 is longer than a threshold amount of time, or if a quantity of skipped CLI measurement occasions 365 is more than a threshold quantity since a last CLI measurement, after the off duration 360 of the DRX cycle 350 (e.g., at the beginning of an on duration 355 of a next DRX cycle 350), the UE 115-*a* may reset the filter, for example, by replacing $\alpha$ with "1" for the first CLI measurement occasion in the on duration 355 of a next DRX cycle 350.

In some aspects, the UE 115-*a* may transmit capability signaling 335 to the network entity 105-*a*. For example, the capability signaling 335 may indicate that the UE 115-*a* supports skipping CLI measurements in CLI measurement occasions 365 scheduled during the off duration 360 of a DRX cycle 350. As another example, the capability signaling 335 may indicate that the UE 115-*a* supports adjusting the CLI filter coefficient $\alpha$ and/or resetting the CLI filter coefficient $\alpha$ based on skipping CLI measurements in CLI measurement occasions 365 scheduled during the off duration 360 of a DRX cycle 350.

Figure 4:
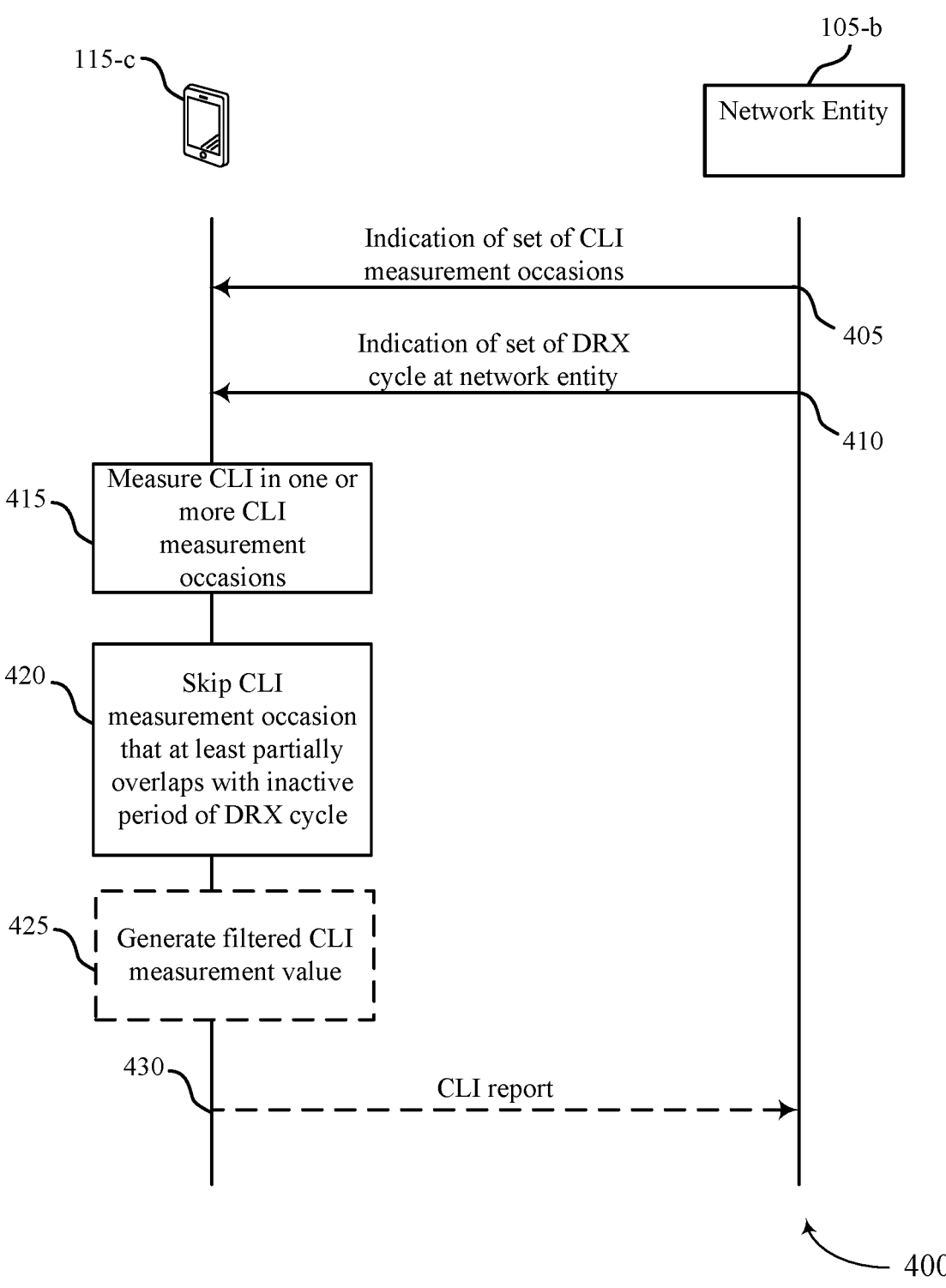
FIG. 4 illustrates an example of a process flow that supports techniques for CLI measurement for cell DRX in accordance with one or more aspects of the present disclosure.

FIG. 4 illustrates an example of a process flow 400 that supports techniques for CLI measurement for cell DRX in accordance with one or more aspects of the present disclosure. The process flow 400 may include a UE 115-*c*, which may be an example of a UE 115 as described herein. The process flow 400 may include a network entity 105-*b*, which may be an example of a network entity 105 as described herein. In the following description of the process flow 400, the operations between the network entity 105-*b* and the UE 115-*c* may be transmitted in a different order than the example order shown, or the operations performed by the network entity 105-*b* and the UE 115-*c* may be performed in different orders or at different times. Some operations may also be omitted from the process flow 400, and other operations may be added to the process flow 400.

At 405, the UE 115-*c* may receive, from the network entity 105-*b*, first control information indicative of a set of scheduled CLI measurement occasions. The set of scheduled CLI measurement occasions may be associated with a same CLI measurement resource configuration.

At 410, the UE 115-*c* may receive, from the network entity 105-*b*, second control information indicative of a DRX cycle at the network entity 105-*b*. The DRX cycle includes an active period during which the network entity 105-*b* is active for message reception and an inactive period during which the network entity 105-*b* is inactive for message reception.

At 415, the UE 115-*c* may measure CLI during one or more of the set of scheduled CLI measurement occasions in accordance with the first control information.

At 420, the UE 115-*c* may skip a CLI measurement for a scheduled CLI measurement occasion of the set of scheduled CLI measurement occasions based on the scheduled CLI measurement occasion at least partially overlapping in time with the inactive period of the DRX cycle.

In some aspects, the UE 115-*c* may receive, from the network entity 105-*b*, third control information that enables the UE 115-*c* to skip the scheduled CLI measurement occasion. In some aspects, the first control information and the third control information may be received in a same control message. In some aspects, the first control information and the third control information may be received in different control messages. In some aspects, the UE 115-*c* may receive, from the network entity 105-*b*, fourth control information that includes an indication that at least one of the one or more of the set of scheduled CLI measurement occasions at least partially overlaps in time with the inactive period of the DRX cycle. For example, the fourth control information may include an indication enabling the UE 115-c to perform a CLI measurement in a scheduled CLI measurement occasion that at least partially overlaps with the inactive period of the DRX cycle.

In some aspects, at 425, the UE 115-c may generate a filtered CLI measurement value for the set of scheduled CLI measurement occasions, where the filtered CLI measurement value is generated based on one or more weighted coefficients that are weighted based on the CLI measurement being skipped at 420. In some aspects, at 430, the UE 115-c may transmit, to the network entity 105-b, a report indicative of the filtered CLI measurement value. In some aspects, the UE 115-c may adjust the one or more weighted coefficients based on a duration of time between a first measured CLI measurement occasion before the scheduled CLI measurement occasion that is skipped and a second measured CLI measurement occasion after the scheduled CLI measurement occasion that is skipped. In some aspects, the adjustment is based on a comparison between the duration of time and a threshold. In some aspects, the UE 115-c may transmit, to the network entity 105-b, third control information indicative of a capability of the UE 115-c to adjust the one or more weighted coefficients based on the duration of time.

In some aspects, the UE 115-c may transmit, to the network entity, third control information indicative of a capability of the UE 115-c to skip one or more scheduled CLI measurement occasions that at least partially overlap in time with the inactive period of the DRX cycle.

Figure 5:
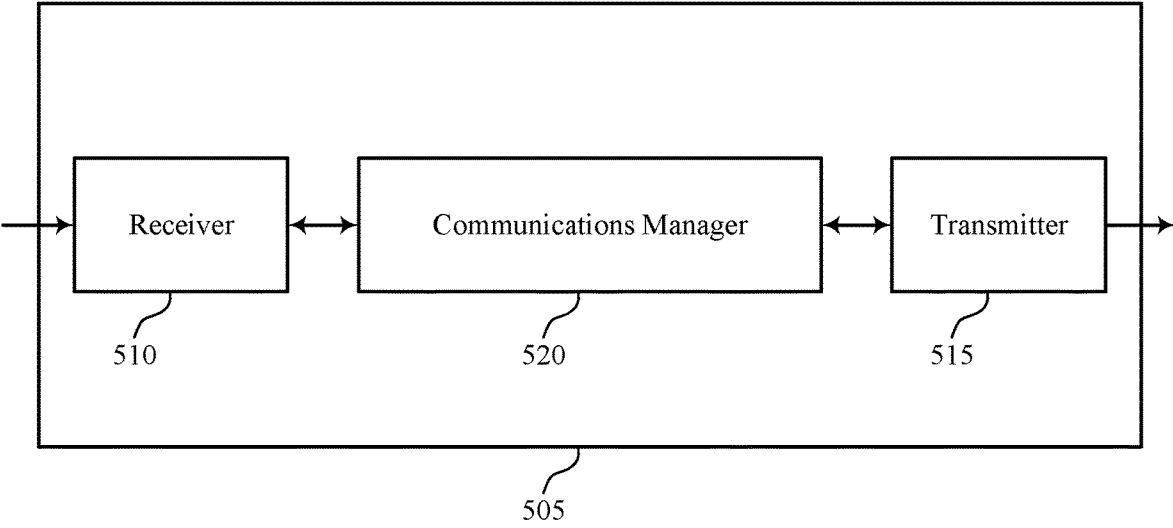
FIGS. 5 and 6 illustrate block diagrams of devices that support techniques for CLI measurement for cell DRX in accordance with one or more aspects of the present disclosure.

FIG. 5 illustrates a block diagram 500 of a device 505 that supports techniques for CLI measurement for cell DRX in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for CLI measurement for cell DRX). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for CLI measurement for cell DRX). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for CLI measurement for cell DRX as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first network node in accordance with examples as disclosed herein. For example, the communications manager 520 may be configured as or otherwise support a means for receiving first control information indicative of a set of scheduled CLI measurement occasions. The communications manager 520 may be configured as or otherwise support a means for receiving second control information indicative of a DRX cycle at a second network node, where the DRX cycle includes an active period during which the second network node is active for message reception and an inactive period during which the second network node is inactive for message reception. The communications manager 520 may be configured as or otherwise support a means for measuring CLI during one or more of the set of scheduled CLI measurement occasions in accordance with the first control information. The communications manager 520 may be configured as or otherwise support a means for skipping a CLI measurement for a scheduled CLI measurement occasion of the set of scheduled CLI measurement occasions based on the scheduled CLI measurement occasion at least partially overlapping in time with the inactive period of the DRX cycle.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and more efficient utilization of communication resources.

Figure 6:
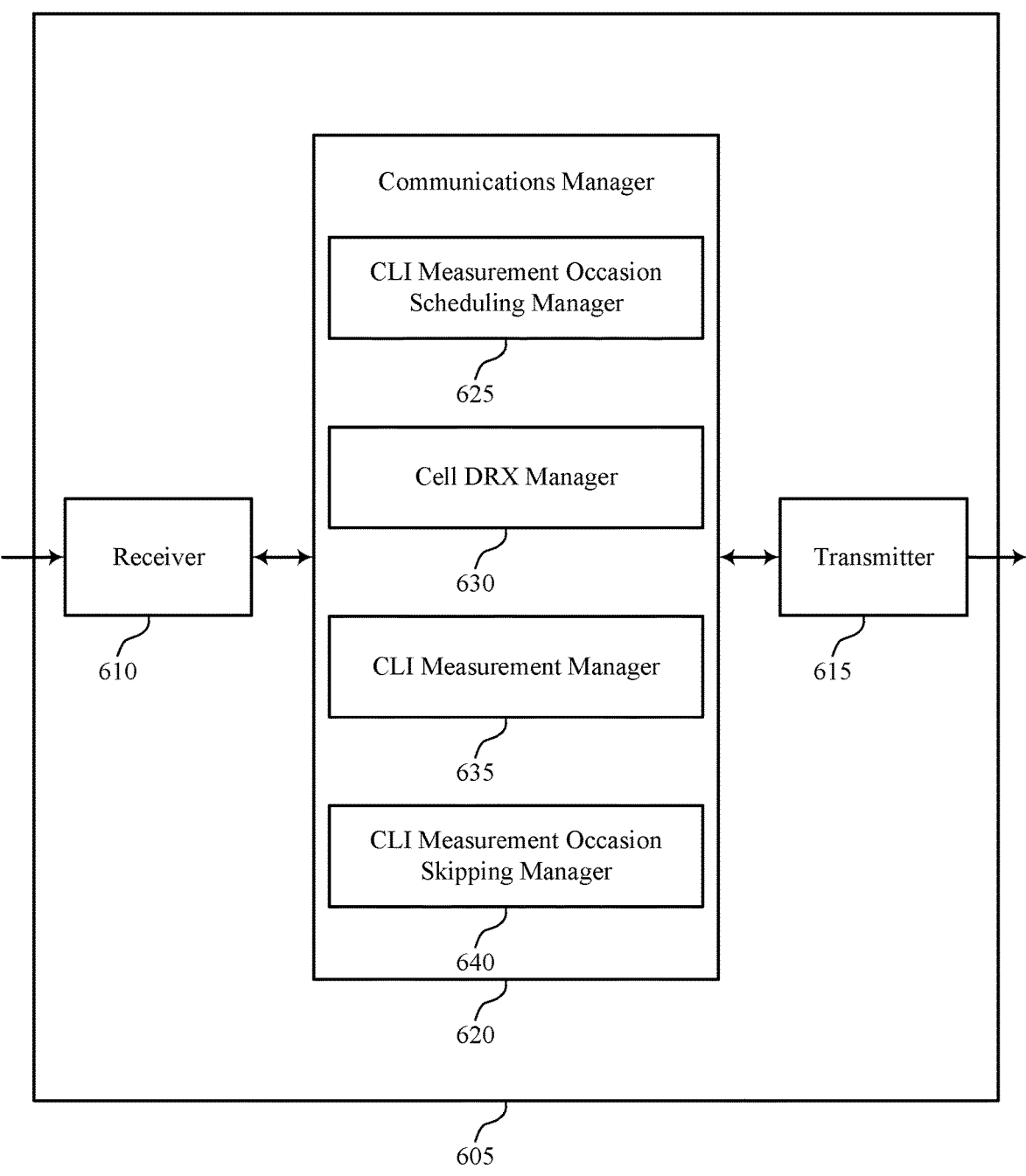

FIG. 6 illustrates a block diagram 600 of a device 605 that supports techniques for CLI measurement for cell DRX in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for CLI measurement for cell DRX). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for CLI measurement for cell DRX). In some aspects, the transmitter 615 may be co-located with a receiver 610 in a transceiver module. The transmitter 615 may utilize a single antenna or a set of multiple antennas.

The device 605, or various components thereof, may be an example of means for performing various aspects of techniques for CLI measurement for cell DRX as described herein. For example, the communications manager 620 may include a CLI measurement occasion scheduling manager 625, a cell DRX manager 630, a CLI measurement manager 635, a CLI measurement occasion skipping manager 640, or any combination thereof. The communications manager 620 may be an example of aspects of a communications manager 520 as described herein. In some aspects, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first network node in accordance with examples as disclosed herein. The CLI measurement occasion scheduling manager 625 may be configured as or otherwise support a means for receiving first control information indicative of a set of scheduled CLI measurement occasions. The cell DRX manager 630 may be configured as or otherwise support a means for receiving second control information indicative of a DRX cycle at a second network node, where the DRX cycle includes an active period during which the second network node is active for message reception and an inactive period during which the second network node is inactive for message reception. The CLI measurement manager 635 may be configured as or otherwise support a means for measuring CLI during one or more of the set of scheduled CLI measurement occasions in accordance with the first control information. The CLI measurement occasion skipping manager 640 may be configured as or otherwise support a means for skipping a CLI measurement for a scheduled CLI measurement occasion of the set of scheduled CLI measurement occasions based on the scheduled CLI measurement occasion at least partially overlapping in time with the inactive period of the DRX cycle.

Figure 7:
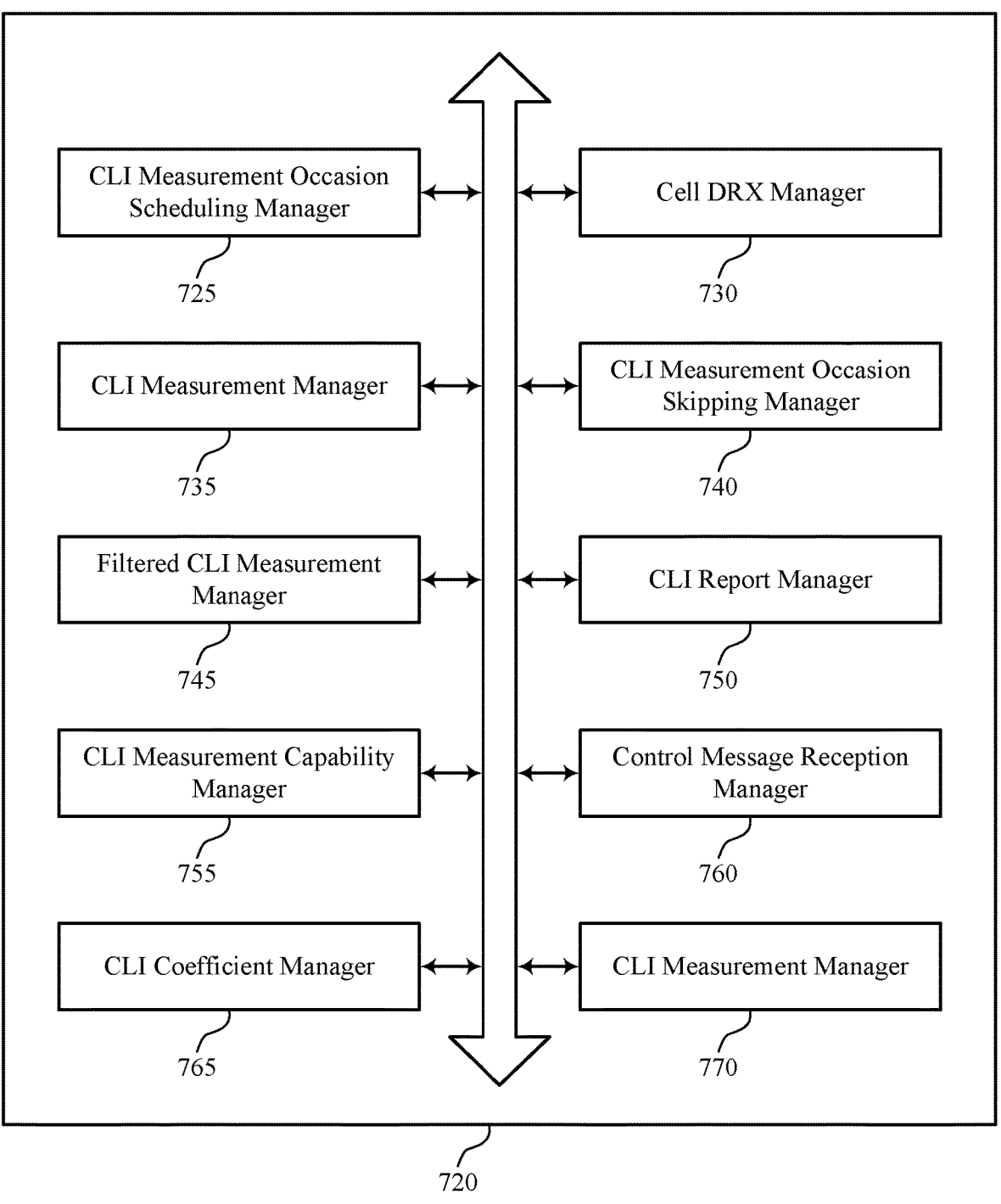
FIG. 7 illustrates a block diagram of a communications manager that supports techniques for CLI measurement for cell DRX in accordance with one or more aspects of the present disclosure.

FIG. 7 illustrates a block diagram 700 of a communications manager 720 that supports techniques for CLI measurement for cell DRX in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for CLI measurement for cell DRX as described herein. For example, the communications manager 720 may include a CLI measurement occasion scheduling manager 725, a cell DRX manager 730, a CLI measurement manager 735, a CLI measurement occasion skipping manager 740, a filtered CLI measurement manager 745, a CLI report manager 750, a CLI measurement capability manager 755, a control message reception manager 760, a CLI coefficient manager 765, a CLI measurement manager 770, or any combination thereof. Each of these components may communicate, directly or indirectly, with one another (e.g., via one or more buses).

The communications manager 720 may support wireless communications at a first network node in accordance with examples as disclosed herein. The CLI measurement occasion scheduling manager 725 may be configured as or otherwise support a means for receiving first control information indicative of a set of scheduled CLI measurement occasions. The cell DRX manager 730 may be configured as or otherwise support a means for receiving second control information indicative of a DRX cycle at a second network node, where the DRX cycle includes an active period during which the second network node is active for message reception and an inactive period during which the second network node is inactive for message reception. The CLI measurement manager 735 may be configured as or otherwise support a means for measuring CLI during one or more of the set of scheduled CLI measurement occasions in accordance with the first control information. The CLI measurement occasion skipping manager 740 may be configured as or otherwise support a means for skipping a CLI measurement for a scheduled CLI measurement occasion of the set of scheduled CLI measurement occasions based on the scheduled CLI measurement occasion at least partially overlapping in time with the inactive period of the DRX cycle.

In some aspects, the CLI measurement occasion skipping manager 740 may be configured as or otherwise support a means for receiving third control information that enables the first network node to skip the scheduled CLI measurement occasion.

In some aspects, the CLI measurement manager 735 may be configured as or otherwise support a means for receiving fourth control information that includes an indication that at least one of the one or more of the set of scheduled CLI measurement occasions at least partially overlaps in time with the inactive period of the DRX cycle.

In some aspects, to support receiving the fourth control information, the CLI measurement manager 770 may be configured as or otherwise support a means for receiving the fourth control information from the second network node, where the fourth control information includes an indication enabling measurement of cross link interference in the at least one of the one or more of the set of scheduled CLI measurement occasions that at least partially overlaps in time with the inactive period of the DRX cycle.

In some aspects, the control message reception manager 760 may be configured as or otherwise support a means for receiving a first control message including the first control information. In some aspects, the control message reception manager 760 may be configured as or otherwise support a means for receiving a second control message including the third control information.

In some aspects, the control message reception manager 760 may be configured as or otherwise support a means for receiving a same control message including the first control information and the third control information.

In some aspects, the filtered CLI measurement manager 745 may be configured as or otherwise support a means for generating a filtered CLI measurement value for the set of scheduled CLI measurement occasions, where the filtered CLI measurement value is generated based on one or more weighted coefficients that are weighted based on the CLI measurement being skipped. In some aspects, the CLI report manager 750 may be configured as or otherwise support a means for transmitting, to the second network node, a report indicative of the filtered CLI measurement value.

In some aspects, the CLI coefficient manager 765 may be configured as or otherwise support a means for adjusting the one or more weighted coefficients based on a duration of time between a first measured CLI measurement occasion before the scheduled CLI measurement occasion that is skipped and a second measured CLI measurement occasion after the scheduled CLI measurement occasion that is skipped.

In some aspects, the CLI measurement capability manager 755 may be configured as or otherwise support a means for transmitting, to the second network node, third control information indicative of a capability of the first network node to adjust the one or more weighted coefficients based on the duration of time.

In some aspects, the adjustment is based on a comparison between the duration of time and a threshold.

In some aspects, the CLI measurement capability manager 755 may be configured as or otherwise support a means for transmit, to the second network node, third control information indicative of a capability of the first network node to skip one or more scheduled CLI measurement occasions that at least partially overlap in time with the inactive period of the DRX cycle.

In some aspects, the set of scheduled CLI measurement occasions are associated with a same CLI measurement resource configuration.

Figure 8:
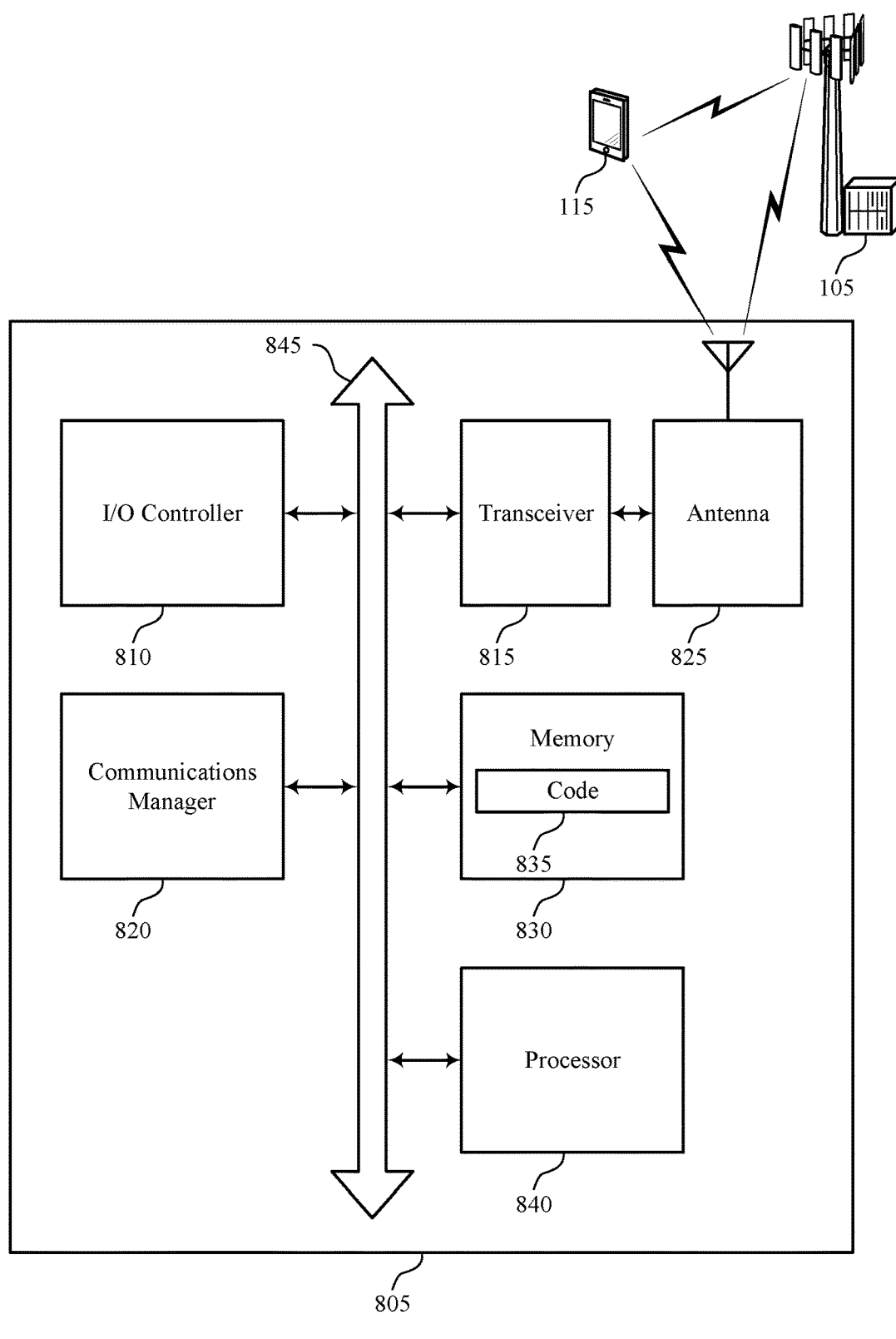
FIG. 8 illustrates a diagram of a system including a device that supports techniques for CLI measurement for cell DRX in accordance with one or more aspects of the present disclosure.

FIG. 8 illustrates a diagram of a system 800 including a device 805 that supports techniques for CLI measurement for cell DRX in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for CLI measurement for cell DRX). For example, the device 805 or a component of the device 805 may include a processor 840 and memory 830 coupled with or to the processor 840, the processor 840 and memory 830 configured to perform various functions described herein.

The communications manager 820 may support wireless communications at a first network node in accordance with examples as disclosed herein. For example, the communications manager 820 may be configured as or otherwise support a means for receiving first control information indicative of a set of scheduled CLI measurement occasions. The communications manager 820 may be configured as or otherwise support a means for receiving second control information indicative of a DRX cycle at a second network node, where the DRX cycle includes an active period during which the second network node is active for message reception and an inactive period during which the second network node is inactive for message reception. The communications manager 820 may be configured as or otherwise support a means for measuring CLI during one or more of the set of scheduled CLI measurement occasions in accordance with the first control information. The communications manager 820 may be configured as or otherwise support a means for skipping a CLI measurement for a scheduled CLI measurement occasion of the set of scheduled CLI measurement occasions based on the scheduled CLI measurement occasion at least partially overlapping in time with the inactive period of the DRX cycle.

By including or configuring the communications manager 820 in accordance with examples as described herein, the device 805 may support techniques for reduced power consumption, more efficient utilization of communication resources, and improved coordination between devices.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some aspects, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for CLI measurement for cell DRX as described herein, or the processor 840 and the memory 830 may be otherwise configured to perform or support such operations.

Figure 9:
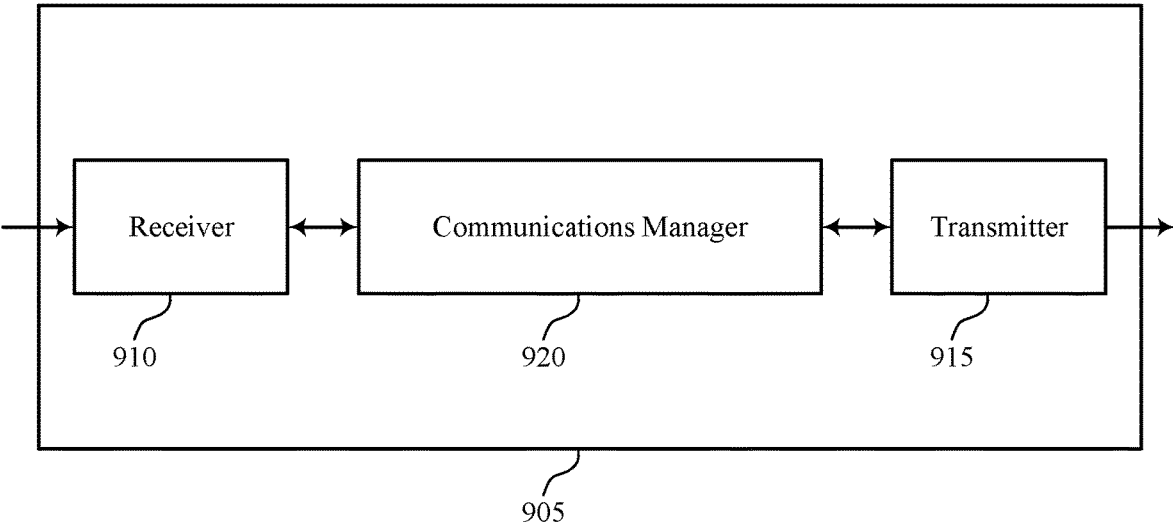
FIGS. 9 and 10 illustrate block diagrams of devices that support techniques for CLI measurement for cell DRX in accordance with one or more aspects of the present disclosure.

FIG. 9 illustrates a block diagram 900 of a device 905 that supports techniques for CLI measurement for cell DRX in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for CLI measurement for cell DRX as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first network node in accordance with examples as disclosed herein. For example, the communications manager 920 may be configured as or otherwise support a means for transmitting, to a second network node, first control information indicative of a set of scheduled CLI measurement occasions. The communications manager 920 may be configured as or otherwise support a means for transmitting second control information indicative of a DRX cycle at the first network node, where the DRX cycle includes an active period during which the second network node is active for message reception and an inactive period during which the second network node is inactive for message reception. The communications manager 920 may be configured as or otherwise support a means for transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption and more efficient utilization of communication resources.

Figure 10:
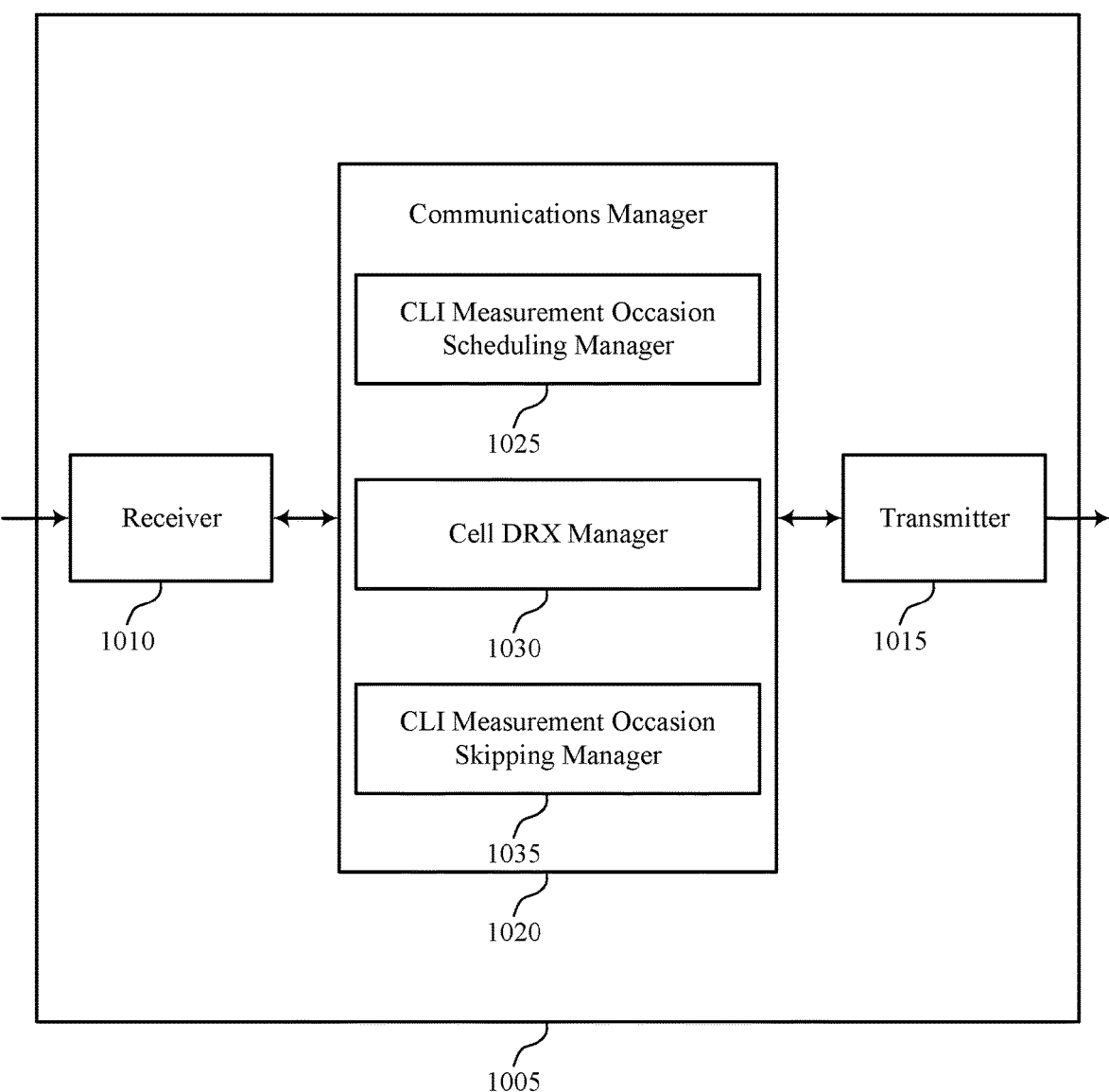

FIG. 10 illustrates a block diagram 1000 of a device 1005 that supports techniques for CLI measurement for cell DRX in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The device 1005, or various components thereof, may be an example of means for performing various aspects of techniques for CLI measurement for cell DRX as described herein. For example, the communications manager 1020 may include a CLI measurement occasion scheduling manager 1025, a cell DRX manager 1030, a CLI measurement occasion skipping manager 1035, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first network node in accordance with examples as disclosed herein. The CLI measurement occasion scheduling manager 1025 may be configured as or otherwise support a means for transmitting, to a second network node, first control information indicative of a set of scheduled CLI measurement occasions. The cell DRX manager 1030 may be configured as or otherwise support a means for transmitting second control information indicative of a DRX cycle at the first network node, where the DRX cycle includes an active period during which the second network node is active for message reception and an inactive period during which the second network node is inactive for message reception. The CLI measurement occasion skipping manager 1035 may be configured as or otherwise support a means for transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

Figure 11:
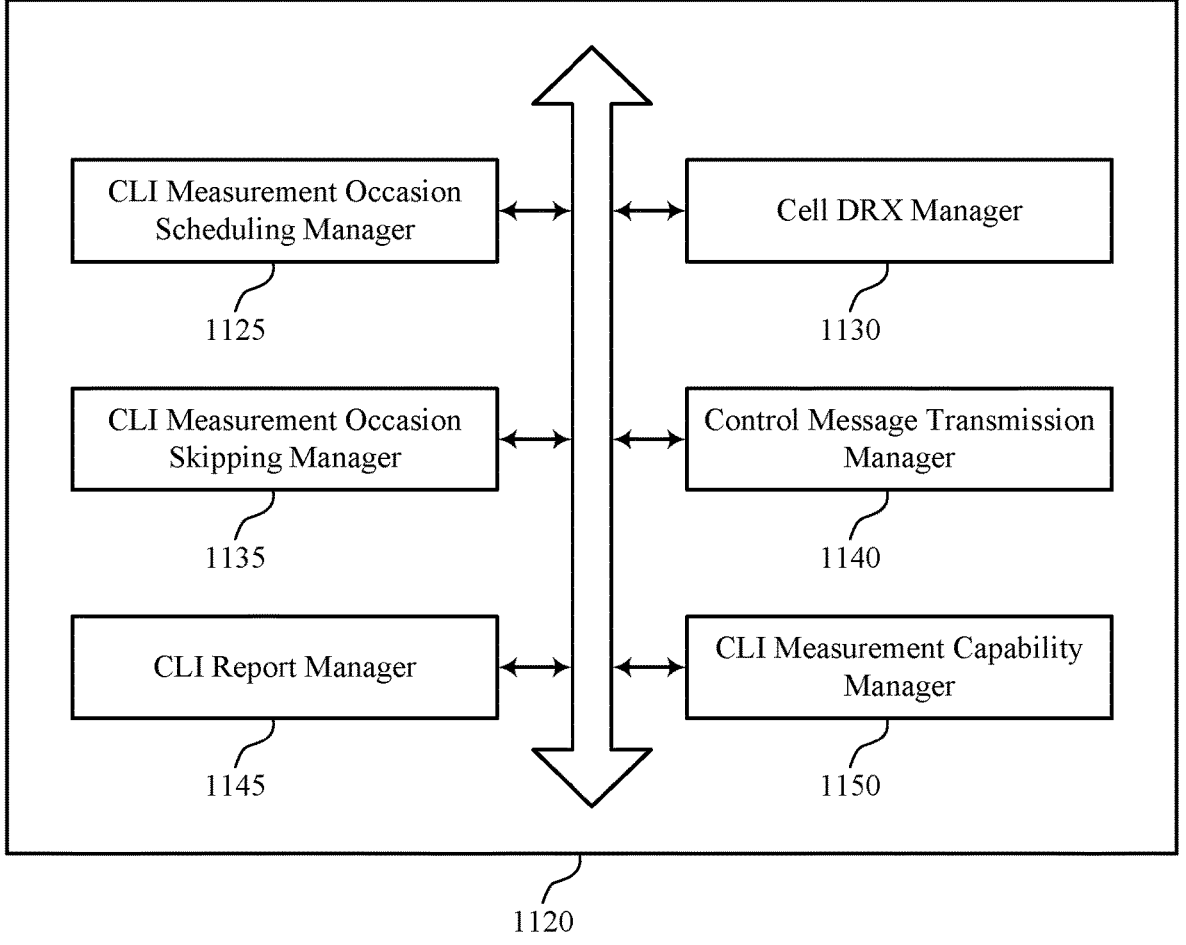
FIG. 11 illustrates a block diagram of a communications manager that supports techniques for CLI measurement for cell DRX in accordance with one or more aspects of the present disclosure.

FIG. 11 illustrates a block diagram 1100 of a communications manager 1120 that supports techniques for CLI measurement for cell DRX in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for CLI measurement for cell DRX as described herein. For example, the communications manager 1120 may include a CLI measurement occasion scheduling manager 1125, a cell DRX manager 1130, a CLI measurement occasion skipping manager 1135, a control message transmission manager 1140, a CLI report manager 1145, a CLI measurement capability manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a first network node in accordance with examples as disclosed herein. The CLI measurement occasion scheduling manager 1125 may be configured as or otherwise support a means for transmitting, to a second network node, first control information indicative of a set of scheduled CLI measurement occasions. The cell DRX manager 1130 may be configured as or otherwise support a means for transmitting second control information indicative of a DRX cycle at the first network node, where the DRX cycle includes an active period during which the second network node is active for message reception and an inactive period during which the second network node is inactive for message reception. The CLI measurement occasion skipping manager 1135 may be configured as or otherwise support a means for transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

In some aspects, the third control information enables the second network node to skip the CLI measurement for the scheduled CLI measurement occasion.

In some aspects, the CLI report manager 1145 may be configured as or otherwise support a means for receiving, from the second network node, a report indicative of a filtered CLI measurement value generated at the second network node for the set of scheduled CLI measurement occasions based on one or more weighted coefficients that are weighted based on the CLI measurement being skipped.

In some aspects, the CLI measurement capability manager 1150 may be configured as or otherwise support a means for receiving, from the second network node, fourth control information indicative of a capability of the second network node to adjust one or more weighted coefficients based on a duration of time between a first measured CLI measurement occasion before the scheduled CLI measurement occasion that is skipped and a second measured CLI measurement occasion after the scheduled CLI measurement occasion that is skipped.

In some aspects, the CLI measurement capability manager 1150 may be configured as or otherwise support a means for receiving, from the second network node, fourth control information indicative of a capability of the second network node to skip one or more scheduled CLI measurement occasions that at least partially overlap in time with the inactive period of the DRX cycle.

In some aspects, the third control information enables the second network node to perform CLI measurements for the scheduled CLI measurement occasion.

In some aspects, the control message transmission manager 1140 may be configured as or otherwise support a means for transmitting a first control message including the first control information. In some aspects, the control message transmission manager 1140 may be configured as or otherwise support a means for transmitting a second control message including the third control information.

In some aspects, the control message transmission manager 1140 may be configured as or otherwise support a means for transmitting a same control message including the first control information and the third control information.

In some aspects, the set of scheduled CLI measurement occasions are associated with a same CLI measurement resource configuration.

Figure 12:
FIG. 12 illustrates a diagram of a system including a device that supports techniques for CLI measurement for cell DRX in accordance with one or more aspects of the present disclosure.

FIG. 12 illustrates a diagram of a system 1200 including a device 1205 that supports techniques for CLI measurement for cell DRX in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some aspects, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for CLI measurement for cell DRX). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communications at a first network node in accordance with examples as disclosed herein. For example, the communications manager 1220 may be configured as or otherwise support a means for transmitting, to a second network node, first control information indicative of a set of scheduled CLI measurement occasions. The communications manager 1220 may be configured as or otherwise support a means for transmitting second control information indicative of a DRX cycle at the first network node, where the DRX cycle includes an active period during which the second network node is active for message reception and an inactive period during which the second network node is inactive for message reception. The communications manager 1220 may be configured as or otherwise support a means for transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

By including or configuring the communications manager 1220 in accordance with examples as described herein, the device 1205 may support techniques for reduced power consumption, more efficient utilization of communication resources, and improved coordination between devices.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for CLI measurement for cell DRX as described herein, or the processor 1235 and the memory 1225 may be otherwise configured to perform or support such operations.

Figure 13:
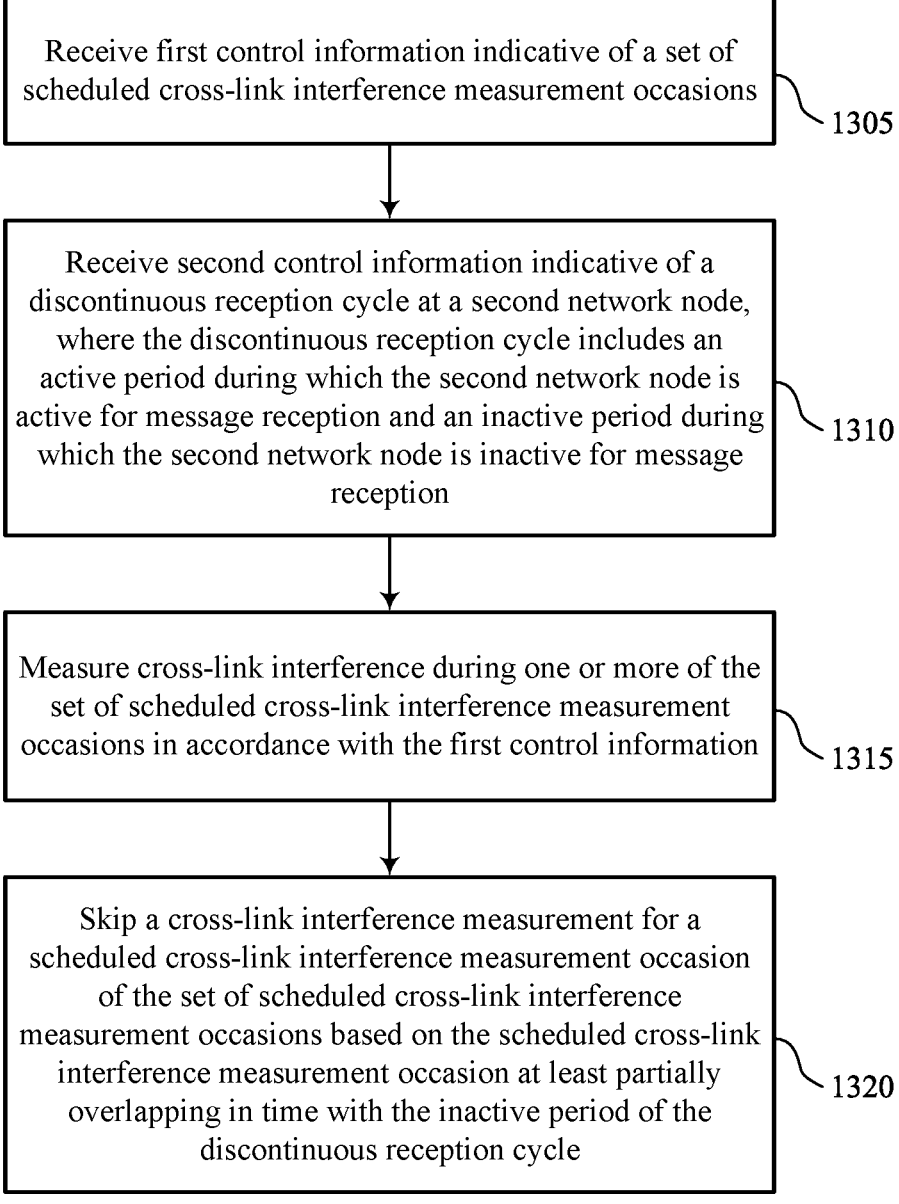

FIG. 13 illustrates a flowchart showing a method 1300 that supports techniques for CLI measurement for cell DRX in accordance with one or more aspects of the present disclosure. The operations of the method 1300 may be implemented by a UE or its components as described herein.

For example, the operations of the method 1300 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1305, the method may include receiving first control information indicative of a set of scheduled CLI measurement occasions. The operations of 1305 may be performed in accordance with examples as disclosed herein. In some aspects, aspects of the operations of 1305 may be performed by a CLI measurement occasion scheduling manager 725 as described with reference to FIG. 7.

At 1310, the method may include receiving second control information indicative of a DRX cycle at a second network node, where the DRX cycle includes an active period during which the second network node is active for message reception and an inactive period during which the second network node is inactive for message reception. The operations of 1310 may be performed in accordance with examples as disclosed herein. In some aspects, aspects of the operations of 1310 may be performed by a cell DRX manager 730 as described with reference to FIG. 7.

At 1315, the method may include measuring CLI during one or more of the set of scheduled CLI measurement occasions in accordance with the first control information. The operations of 1315 may be performed in accordance with examples as disclosed herein. In some aspects, aspects of the operations of 1315 may be performed by a CLI measurement manager 735 as described with reference to FIG. 7.

At 1320, the method may include skipping a CLI measurement for a scheduled CLI measurement occasion of the set of scheduled CLI measurement occasions based on the scheduled CLI measurement occasion at least partially overlapping in time with the inactive period of the DRX cycle. The operations of 1320 may be performed in accordance with examples as disclosed herein. In some aspects, aspects of the operations of 1320 may be performed by a CLI measurement occasion skipping manager 740 as described with reference to FIG. 7.

FIG. 14 illustrates a flowchart showing a method 1400 that supports techniques for CLI measurement for cell DRX in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1405, the method may include receiving first control information indicative of a set of scheduled CLI measurement occasions. The operations of 1405 may be performed in accordance with examples as disclosed herein. In some aspects, aspects of the operations of 1405 may be performed by a CLI measurement occasion scheduling manager 725 as described with reference to FIG. 7.

At 1410, the method may include receiving second control information indicative of a DRX cycle at a second network node, where the DRX cycle includes an active period during which the second network node is active for message reception and an inactive period during which the second network node is inactive for message reception. The operations of 1410 may be performed in accordance with examples as disclosed herein. In some aspects, aspects of the operations of 1410 may be performed by a cell DRX manager 730 as described with reference to FIG. 7.

At 1415, the method may include measuring CLI during one or more of the set of scheduled CLI measurement occasions in accordance with the first control information. The operations of 1415 may be performed in accordance with examples as disclosed herein. In some aspects, aspects of the operations of 1415 may be performed by a CLI measurement manager 735 as described with reference to FIG. 7.

At 1420, the method may include receiving third control information that enables the first network node to skip a scheduled CLI measurement occasion based on the scheduled CLI measurement occasion at least partially overlapping in time with the inactive period of the DRX cycle. The operations of 1420 may be performed in accordance with examples as disclosed herein. In some aspects, aspects of the operations of 1420 may be performed by a CLI measurement occasion skipping manager 740 as described with reference to FIG. 7.

At 1425, the method may include skipping a CLI measurement for the scheduled CLI measurement occasion of the set of scheduled CLI measurement occasions. The operations of 1425 may be performed in accordance with examples as disclosed herein. In some aspects, aspects of the operations of 1425 may be performed by a CLI measurement occasion skipping manager 740 as described with reference to FIG. 7.

FIG. 15 illustrates a flowchart showing a method 1500 that supports techniques for CLI measurement for cell DRX in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some aspects, a UE may execute a set of instructions to control the functional elements of the UE to perform the described functions. Additionally, or alternatively, the UE may perform aspects of the described functions using special-purpose hardware.

At 1505, the method may include receiving first control information indicative of a set of scheduled CLI measurement occasions. The operations of 1505 may be performed in accordance with examples as disclosed herein. In some aspects, aspects of the operations of 1505 may be performed by a CLI measurement occasion scheduling manager 725 as described with reference to FIG. 7.

At 1510, the method may include receiving second control information indicative of a DRX cycle at a second network node, where the DRX cycle includes an active period during which the second network node is active for message reception and an inactive period during which the second network node is inactive for message reception. The operations of 1510 may be performed in accordance with examples as disclosed herein. In some aspects, aspects of the operations of 1510 may be performed by a cell DRX manager 730 as described with reference to FIG. 7.

At 1515, the method may include measuring CLI during one or more of the set of scheduled CLI measurement occasions in accordance with the first control information. The operations of 1515 may be performed in accordance with examples as disclosed herein. In some aspects, aspects of the operations of 1515 may be performed by a CLI measurement manager 735 as described with reference to FIG. 7.

At 1520, the method may include skipping a CLI measurement for a scheduled CLI measurement occasion of the set of scheduled CLI measurement occasions based on the scheduled CLI measurement occasion at least partially overlapping in time with the inactive period of the DRX cycle. The operations of 1520 may be performed in accordance with examples as disclosed herein. In some aspects, aspects of the operations of 1520 may be performed by a CLI measurement occasion skipping manager 740 as described with reference to FIG. 7.

At 1525, the method may include generating a filtered CLI measurement value for the set of scheduled CLI measurement occasions, where the filtered CLI measurement value is generated based on one or more weighted coefficients that are weighted based on the CLI measurement being skipped. The operations of 1525 may be performed in accordance with examples as disclosed herein. In some aspects, aspects of the operations of 1525 may be performed by a filtered CLI measurement manager 745 as described with reference to FIG. 7.

At 1530, the method may include transmitting, to the second network node, a report indicative of the filtered CLI measurement value. The operations of 1530 may be performed in accordance with examples as disclosed herein. In some aspects, aspects of the operations of 1530 may be performed by a CLI report manager 750 as described with reference to FIG. 7.

FIG. 16 illustrates a flowchart showing a method 1600 that supports techniques for CLI measurement for cell DRX in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some aspects, a network entity may execute a set of instructions to control the functional elements of the network entity to perform the described functions. Additionally, or alternatively, the network entity may perform aspects of the described functions using special-purpose hardware.

At 1605, the method may include transmitting, to a second network node, first control information indicative of a set of scheduled CLI measurement occasions. The operations of 1605 may be performed in accordance with examples as disclosed herein. In some aspects, aspects of the operations of 1605 may be performed by a CLI measurement occasion scheduling manager 1125 as described with reference to FIG. 11.

At 1610, the method may include transmitting second control information indicative of a DRX cycle at the first network node, where the DRX cycle includes an active period during which the second network node is active for message reception and an inactive period during which the second network node is inactive for message reception. The operations of 1610 may be performed in accordance with examples as disclosed herein. In some aspects, aspects of the operations of 1610 may be performed by a cell DRX manager 1130 as described with reference to FIG. 11.

At 1615, the method may include transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle. The operations of 1615 may be performed in accordance with examples as disclosed herein. In some aspects, aspects of the operations of 1615 may be performed by a CLI measurement occasion skipping manager 1135 as described with reference to FIG. 11.

The following provides an overview of aspects of the present disclosure:

Aspect 1: A method for wireless communications at a first network node, comprising: receiving first control information indicative of a set of scheduled CLI measurement occasions; receiving second control information indicative of a DRX cycle at a second network node, wherein the DRX cycle comprises an active period during which the second network node is active for message reception and an inactive period during which the second network node is inactive for message reception; measuring CLI during one or more of the set of scheduled CLI measurement occasions in accordance with the first control information; and skipping a CLI measurement for a scheduled CLI measurement occasion of the set of scheduled CLI measurement occasions based on the scheduled CLI measurement occasion at least partially overlapping in time with the inactive period of the DRX cycle.

Aspect 2: The method of aspect 1, further comprising: receiving third control information that enables the first network node to skip the scheduled CLI measurement occasion.

Aspect 3: The method of aspect 2, further comprising: receiving fourth control information that includes an indication that at least one of the one or more of the set of scheduled CLI measurement occasions at least partially overlaps in time with the inactive period of the DRX cycle.

Aspect 4: The method of aspect 3, wherein receiving the fourth control information comprises: receiving the fourth control information from the second network node, wherein the fourth control information includes an indication enabling measurement of cross link interference in the at least one of the one or more of the set of scheduled CLI measurement occasions that at least partially overlaps in time with the inactive period of the DRX cycle.

Aspect 5: The method of any of aspects 2 through 4, further comprising: receiving a first control message comprising the first control information; and receiving a second control message comprising the third control information.

Aspect 6: The method of any of aspects 2 through 4, further comprising: receiving a same control message comprising the first control information and the third control information.

Aspect 7: The method of any of aspects 1 through 6, further comprising: generating a filtered CLI measurement value for the set of scheduled CLI measurement occasions, wherein the filtered CLI measurement value is generated based on one or more weighted coefficients that are weighted based on the CLI measurement being skipped; and transmitting, to the second network node, a report indicative of the filtered CLI measurement value.

Aspect 8: The method of aspect 7, further comprising: adjusting the one or more weighted coefficients based on a duration of time between a first measured CLI measurement occasion before the scheduled CLI measurement occasion that is skipped and a second measured CLI measurement occasion after the scheduled CLI measurement occasion that is skipped Aspect 9: The method of aspect 8, further comprising: transmitting, to the second network node, third control information indicative of a capability of the first network node to adjust the one or more weighted coefficients based on the duration of time.

Aspect 10: The method of any of aspects 8 through 9, wherein the adjustment is based on a comparison between the duration of time and a threshold.

Aspect 11: The method of any of aspects 1 through 10, further comprising: transmit, to the second network node, third control information indicative of a capability of the first network node to skip one or more scheduled CLI measurement occasions that at least partially overlap in time with the inactive period of the DRX cycle.

Aspect 12: The method of any of aspects 1 through 11, wherein the set of scheduled CLI measurement occasions are associated with a same CLI measurement resource configuration.

Aspect 13: A method for wireless communications at a first network node, comprising: transmitting, to a second network node, first control information indicative of a set of scheduled CLI measurement occasions; transmitting second control information indicative of a DRX cycle at the first network node, wherein the DRX cycle comprises an active period during which the second network node is active for message reception and an inactive period during which the second network node is inactive for message reception; and transmitting, to the second network node, third control information that indicates to the second network node whether to skip a CLI measurement for a scheduled CLI measurement occasion based on the scheduled CLI measurement occasion at least partially overlapping in time with the inactive period of the DRX cycle.

Aspect 14: The method of aspect 13, wherein the third control information enables the second network node to skip the CLI measurement for the scheduled CLI measurement occasion.

Aspect 15: The method of aspect 14, further comprising: receiving, from the second network node, a report indicative of a filtered CLI measurement value generated at the second network node for the set of scheduled CLI measurement occasions based on one or more weighted coefficients that are weighted based on the CLI measurement being skipped.

Aspect 16: The method of aspect 15, further comprising: receiving, from the second network node, fourth control information indicative of a capability of the second network node to adjust one or more weighted coefficients based on a duration of time between a first measured CLI measurement occasion before the scheduled CLI measurement occasion that is skipped and a second measured CLI measurement occasion after the scheduled CLI measurement occasion that is skipped.

Aspect 17: The method of any of aspects 14 through 16, further comprising: receiving, from the second network node, fourth control information indicative of a capability of the second network node to skip one or more scheduled CLI measurement occasions that at least partially overlap in time with the inactive period of the DRX cycle.

Aspect 18: The method of any of aspects 13 through 17, wherein the third control information enables the second network node to perform CLI measurements for the scheduled CLI measurement occasion.

Aspect 19: The method of any of aspects 13 through 18, further comprising: transmitting a first control message comprising the first control information; and transmitting a second control message comprising the third control information.

Aspect 20: The method of any of aspects 13 through 18, further comprising: transmitting a same control message comprising the first control information and the third control information.

Aspect 21: The method of any of aspects 13 through 20, wherein the set of scheduled CLI measurement occasions are associated with a same CLI measurement resource configuration.

Aspect 22: A first network node for wireless communication, comprising: a memory; and at least one processor coupled to the memory, wherein the at least one processor is configured to perform a method of any of aspects 1 through 12.

Aspect 23: An apparatus for wireless communications at a first network node, comprising at least one means for performing a method of any of aspects 1 through 12.

Aspect 24: A non-transitory computer-readable medium storing code for wireless communications at a first network node, the code comprising instructions executable by a processor to perform a method of any of aspects 1 through 12.

Aspect 25: A first network node for wireless communication, comprising: a memory; and at least one processor coupled to the memory, wherein the at least one processor is configured to perform a method of any of aspects 13 through 21.

Aspect 26: An apparatus for wireless communications at a first network node, comprising at least one means for performing a method of any of aspects 13 through 21.

Aspect 27: A non-transitory computer-readable medium storing code for wireless communications at a first network node, the code comprising instructions executable by a processor to perform a method of any of aspects 13 through 21.

The methods described herein describe possible implementations, and the operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of"

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
   a memory; and
   at least one processor coupled with the memory, wherein the at least one processor is configured to:
      receive first control information indicative of a set of scheduled cross-link interference measurement occasions;
      receive second control information indicative of a discontinuous reception cycle at a second network node, wherein the discontinuous reception cycle comprises an active period during which the second network node is active for message reception and an inactive period during which the second network node is inactive for message reception;

measure cross-link interference during one or more of the set of scheduled cross-link interference measurement occasions in accordance with the first control information;

skip a cross-link interference measurement for a scheduled cross-link interference measurement occasion of the set of scheduled cross-link interference measurement occasions based on the scheduled cross-link interference measurement occasion at least partially overlapping in time with the inactive period of the discontinuous reception cycle;

generate a filtered cross-link interference measurement value for the set of scheduled cross-link interference measurement occasions, wherein the filtered cross-link interference measurement value is generated based on one or more weighted coefficients that are weighted based on the cross-link interference measurement being skipped;

transmit, to the second network node, a report indicative of the filtered cross-link interference measurement value;

adjust the one or more weighted coefficients based on a duration of time between a first measured cross-link interference measurement occasion before the scheduled cross-link interference measurement occasion that is skipped and a second measured cross-link interference measurement occasion after the scheduled cross-link interference measurement occasion that is skipped; and transmit, to the second network node, third control information indicative of a capability of the first network node to adjust the one or more weighted coefficients based on the duration of time.

2. The first network node of claim 1, wherein the at least one processor is further configured to:

receive the third control information, wherein the third control information enables the first network node to skip the scheduled cross-link interference measurement occasion.

3. The first network node of claim 2, wherein the at least one processor is further configured to:

receive fourth control information that includes an indication that at least one of the one or more of the set of scheduled cross-link interference measurement occasions at least partially overlaps in time with the inactive period of the discontinuous reception cycle.

4. The first network node of claim 3, wherein to receive the fourth control information, the at least one processor is configured to:

receive the fourth control information from the second network node, wherein the fourth control information includes an indication enabling measurement of cross link interference in the at least one of the one or more of the set of scheduled cross-link interference measurement occasions that at least partially overlaps in time with the inactive period of the discontinuous reception cycle.

5. The first network node of claim 2, wherein the at least one processor is further configured to:

receive a first control message comprising the first control information; and receive a second control message comprising the third control information.

6. The first network node of claim 2, wherein the at least one processor is further configured to:

receive a same control message comprising the first control information and the third control information.

7. The first network node of claim 1, wherein the adjustment is based on a comparison between the duration of time and a threshold.

8. The first network node of claim 1, wherein the at least one processor is further configured to:

transmit, to the second network node, the third control information indicative of a capability of the first network node to skip one or more scheduled cross-link interference measurement occasions that at least partially overlap in time with the inactive period of the discontinuous reception cycle.

9. The first network node of claim 1 wherein the set of scheduled cross-link interference measurement occasions are associated with a same cross-link interference measurement resource configuration.

10. A first network node for wireless communication, comprising:

a memory; and at least one processor coupled with the memory, wherein the at least one processor is configured to:

transmit, to a second network node, first control information indicative of a set of scheduled cross-link interference measurement occasions;

transmit second control information indicative of a discontinuous reception cycle at the first network node, wherein the discontinuous reception cycle comprises an active period during which the second network node is active for message reception and an inactive period during which the second network node is inactive for message reception;

transmit, to the second network node, third control information that indicates to the second network node whether to skip a cross-link interference measurement for a scheduled cross-link interference measurement occasion based on the scheduled cross-link interference measurement occasion at least partially overlapping in time with the inactive period of the discontinuous reception cycle, wherein the third control information enables the second network node to skip the cross-link interference measurement for the scheduled cross-link interference measurement occasion;

receive, from the second network node, a report indicative of a filtered cross-link interference measurement value generated at the second network node for the set of scheduled cross-link interference measurement occasions based on one or more weighted coefficients that are weighted based on the cross-link interference measurement being skipped; and receive, from the second network node, fourth control information indicative of a capability of the second network node to adjust one or more weighted coefficients based on a duration of time between a first measured cross-link interference measurement occasion before the scheduled cross-link interference measurement occasion that is skipped and a second measured cross-link interference measurement occasion after the scheduled cross-link interference measurement occasion that is skipped.

11. The first network node of claim 10, wherein the fourth control information is indicative of a capability of the second network node to skip one or more scheduled cross-link interference measurement occasions that at least partially overlap in time with the inactive period of the discontinuous reception cycle.

12. The first network node of claim 10, wherein the third control information enables the second network node to perform cross-link interference measurements for the sched-uled cross-link interference measurement occasion.

13. The first network node of claim 10, wherein the at least one processor is further configured to:

transmit a first control message comprising the first con-trol information; and transmit a second control message comprising the third control information.

14. The first network node of claim 10, wherein the at least one processor is further configured to:

transmit a same control message comprising the first control information and the third control information.

15. The first network node of claim 10, wherein the set of scheduled cross-link interference measurement occasions are associated with a same cross-link interference measure-ment resource configuration.

16. A method for wireless communications at a first network node, comprising:

receiving first control information indicative of a set of scheduled cross-link interference measurement occa-sions;

receiving second control information indicative of a dis-continuous reception cycle at a second network node, wherein the discontinuous reception cycle comprises an active period during which the second network node is active for message reception and an inactive period during which the second network node is inactive for message reception;

measuring cross-link interference during one or more of the set of scheduled cross-link interference measure-ment occasions in accordance with the first control information; and skipping a cross-link interference measurement for a scheduled cross-link interference measurement occa-sion of the set of scheduled cross-link interference measurement occasions based on the scheduled cross-link interference measurement occasion at least par-tially overlapping in time with the inactive period of the discontinuous reception cycle;

receiving third control information that enables the first network node to skip the scheduled cross-link interfer-ence measurement occasion; and receiving fourth control information that includes an indication that at least one of the one or more of the set of scheduled cross-link interference measurement occasions at least partially overlaps in time with the inactive period of the discontinuous reception cycle.

17. The method of claim 16, wherein receiving the fourth control information comprises:

receiving the fourth control information from the second network node, wherein the fourth control information includes an indication enabling measurement of cross link interference in the at least one of the one or more of the set of scheduled cross-link interference measure-ment occasions that at least partially overlaps in time with the inactive period of the discontinuous reception cycle.

18. The method of claim 16, further comprising:

receiving a first control message comprising the first control information; and receiving a second control message comprising the third control information.

19. The method of claim 16, further comprising:

receiving a same control message comprising the first control information and the third control information.

20. The method of claim 16, further comprising:

generating a filtered cross-link interference measurement value for the set of scheduled cross-link interference measurement occasions, wherein the filtered cross-link interference measurement value is generated based on one or more weighted coefficients that are weighted based on the cross-link interference measurement being skipped; and transmitting, to the second network node, a report indica-tive of the filtered cross-link interference measurement value.

21. The method of claim 20, further comprising:

adjusting the one or more weighted coefficients based on a duration of time between a first measured cross-link interference measurement occasion before the sched-uled cross-link interference measurement occasion that is skipped and a second measured cross-link interfer-ence measurement occasion after the scheduled cross-link interference measurement occasion that is skipped.

22. A method for wireless communications at a first network node, comprising:

transmitting, to a second network node, first control information indicative of a set of scheduled cross-link interference measurement occasions;

transmitting second control information indicative of a discontinuous reception cycle at the first network node, wherein the discontinuous reception cycle comprises an active period during which the second network node is active for message reception and an inactive period during which the second network node is inactive for message reception;

transmitting, to the second network node, third control information that indicates to the second network node whether to skip a cross-link interference measurement for a scheduled cross-link interference measurement occasion based on the scheduled cross-link interference measurement occasion at least partially overlapping in time with the inactive period of the discontinuous reception cycle, wherein the third control information enables the second network node to skip the cross-link interference measurement for the scheduled cross-link interference measurement occasion;

receiving, from the second network node, a report indica-tive of a filtered cross-link interference measurement value generated at the second network node for the set of scheduled cross-link interference measurement occasions based on one or more weighted coefficients that are weighted based on the cross-link interference measurement being skipped; and receiving, from the second network node, fourth control information indicative of a capability of the second network node to adjust one or more weighted coeffi-cients based on a duration of time between a first measured cross-link interference measurement occa-sion before the scheduled cross-link interference mea-surement occasion that is skipped and a second mea-sured cross-link interference measurement occasion after the scheduled cross-link interference measure-ment occasion that is skipped.

* * * * *